(12) United States Patent
Teodorescu et al.

(10) Patent No.: US 10,565,206 B2
(45) Date of Patent: *Feb. 18, 2020

(54) QUERY TASK PROCESSING BASED ON MEMORY ALLOCATION AND PERFORMANCE CRITERIA

(71) Applicant: Deephaven Data Labs LLC, Plymouth, MN (US)

(72) Inventors: Radu Teodorescu, New York, NY (US); Ryan Caudy, New York, NY (US); David R. Kent, IV, Colorado Springs, CO (US); Charles Wright, Cortlandt Manor, NY (US)

(73) Assignee: Deephaven Data Labs LLC, Plymouth, MN (US)

( * ) Notice: Subject to any disclaimer, the term of this patent is extended or adjusted under 35 U.S.C. 154(b) by 667 days.

This patent is subject to a terminal disclaimer.

(21) Appl. No.: 15/351,429

(22) Filed: Nov. 14, 2016

(65) Prior Publication Data

US 2018/0137175 A1    May 17, 2018

Related U.S. Application Data

(63) Continuation of application No. 15/154,991, filed on May 14, 2016, now Pat. No. 9,613,109.

(60) Provisional application No. 62/161,813, filed on May 14, 2015.

(51) Int. Cl.
*G06F 17/30* (2006.01)
*G06F 16/2455* (2019.01)
*G06F 16/22* (2019.01)

(52) U.S. Cl.
CPC ...... *G06F 16/24561* (2019.01); *G06F 16/221* (2019.01)

(58) Field of Classification Search
CPC .................. G06F 16/24561; G06F 16/221
USPC ........................................... 707/720
See application file for complete search history.

(56) References Cited

U.S. PATENT DOCUMENTS

| | | | |
|---|---|---|---|
| 5,335,202 | A | 8/1994 | Manning et al. |
| 5,452,434 | A | 9/1995 | Macdonald |
| 5,469,567 | A | 11/1995 | Okada |
| 5,504,885 | A | 4/1996 | Alashqur |
| 5,530,939 | A | 6/1996 | Mansfield et al. |
| 5,568,632 | A | 10/1996 | Nelson |
| 5,673,369 | A | 9/1997 | Kim |
| 5,701,461 | A | 12/1997 | Dalal et al. |
| 5,701,467 | A | 12/1997 | Freeston |
| 5,764,953 | A | 6/1998 | Collins et al. |

(Continued)

FOREIGN PATENT DOCUMENTS

| | | |
|---|---|---|
| CA | 2309462 A1 | 12/2000 |
| EP | 1406463 A2 | 4/2004 |

(Continued)

OTHER PUBLICATIONS

Advisory Action dated Apr. 19, 2017, in U.S. Appl. No. 15/154,999.

(Continued)

*Primary Examiner* — Mark E Hershley
(74) *Attorney, Agent, or Firm* — Carmichael IP, PLLC

(57) ABSTRACT

Described are methods, systems and computer readable media for query task operations based on memory allocation and performance criteria.

30 Claims, 13 Drawing Sheets

(56) References Cited

U.S. PATENT DOCUMENTS

| | | |
|---|---|---|
| 5,787,411 A | 7/1998 | Groff et al. |
| 5,787,428 A | 7/1998 | Hart |
| 5,806,059 A | 9/1998 | Tsuchida et al. |
| 5,808,911 A | 9/1998 | Tucker et al. |
| 5,859,972 A | 1/1999 | Subramaniam et al. |
| 5,873,075 A | 2/1999 | Cochrane et al. |
| 5,875,334 A | 2/1999 | Chow et al. |
| 5,878,415 A | 3/1999 | Olds |
| 5,890,167 A | 3/1999 | Bridge et al. |
| 5,899,990 A | 5/1999 | Maritzen et al. |
| 5,920,860 A | 7/1999 | Maheshwari et al. |
| 5,943,672 A | 8/1999 | Yoshida |
| 5,960,087 A | 9/1999 | Tribble et al. |
| 5,991,810 A | 11/1999 | Shapiro et al. |
| 5,999,918 A | 12/1999 | Williams et al. |
| 6,006,220 A | 12/1999 | Haderle et al. |
| 6,032,144 A | 2/2000 | Srivastava et al. |
| 6,032,148 A | 2/2000 | Wilkes |
| 6,038,563 A | 3/2000 | Bapat et al. |
| 6,058,394 A | 5/2000 | Bakow et al. |
| 6,061,684 A | 5/2000 | Glasser et al. |
| 6,138,112 A | 10/2000 | Slutz |
| 6,160,548 A * | 12/2000 | Lea ............. G11B 27/002 348/512 |
| 6,253,195 B1 * | 6/2001 | Hudis ............ G06F 16/24568 707/713 |
| 6,266,669 B1 | 7/2001 | Brodersen et al. |
| 6,289,357 B1 | 9/2001 | Parker |
| 6,292,803 B1 | 9/2001 | Richardson et al. |
| 6,304,876 B1 | 10/2001 | Isip |
| 6,317,728 B1 | 11/2001 | Kane |
| 6,327,702 B1 | 12/2001 | Sauntry et al. |
| 6,336,114 B1 | 1/2002 | Garrison |
| 6,353,819 B1 | 3/2002 | Edwards et al. |
| 6,367,068 B1 | 4/2002 | Vaidyanathan et al. |
| 6,389,414 B1 | 5/2002 | Delo et al. |
| 6,389,462 B1 | 5/2002 | Cohen et al. |
| 6,397,206 B1 * | 5/2002 | Hill ............ G06F 16/24542 707/713 |
| 6,438,537 B1 | 8/2002 | Netz et al. |
| 6,446,069 B1 | 9/2002 | Yaung et al. |
| 6,460,037 B1 | 10/2002 | Weiss et al. |
| 6,473,750 B1 | 10/2002 | Petculescu et al. |
| 6,487,552 B1 | 11/2002 | Lei et al. |
| 6,496,833 B1 | 12/2002 | Goldberg et al. |
| 6,505,189 B1 | 1/2003 | Au et al. |
| 6,505,241 B2 | 1/2003 | Pitts |
| 6,510,551 B1 | 1/2003 | Miller |
| 6,519,604 B1 * | 2/2003 | Acharya ............ G06F 16/2462 707/738 |
| 6,530,075 B1 | 3/2003 | Beadle et al. |
| 6,538,651 B1 | 3/2003 | Hayman et al. |
| 6,546,402 B1 | 4/2003 | Beyer et al. |
| 6,553,375 B1 | 4/2003 | Huang et al. |
| 6,584,474 B1 | 6/2003 | Pereira |
| 6,604,104 B1 | 8/2003 | Smith |
| 6,618,720 B1 | 9/2003 | Au et al. |
| 6,631,374 B1 | 10/2003 | Klein et al. |
| 6,640,234 B1 | 10/2003 | Coffen et al. |
| 6,697,880 B1 | 2/2004 | Dougherty |
| 6,701,415 B1 | 3/2004 | Hendren |
| 6,714,962 B1 | 3/2004 | Helland et al. |
| 6,725,243 B2 | 4/2004 | Snapp |
| 6,732,100 B1 | 5/2004 | Brodersen et al. |
| 6,745,332 B1 | 6/2004 | Wong et al. |
| 6,748,374 B1 | 6/2004 | Madan et al. |
| 6,748,455 B1 | 6/2004 | Hinson et al. |
| 6,760,719 B1 | 7/2004 | Hanson et al. |
| 6,775,660 B2 | 8/2004 | Lin et al. |
| 6,785,668 B1 | 8/2004 | Polo et al. |
| 6,795,851 B1 | 9/2004 | Noy |
| 6,801,908 B1 * | 10/2004 | Fuloria ............ G06F 16/283 |
| 6,816,855 B2 | 11/2004 | Hartel et al. |
| 6,820,082 B1 | 11/2004 | Cook et al. |
| 6,829,620 B2 | 12/2004 | Michael et al. |
| 6,832,229 B2 | 12/2004 | Reed |
| 6,851,088 B1 | 2/2005 | Conner et al. |
| 6,882,994 B2 | 4/2005 | Yoshimura et al. |
| 6,925,472 B2 | 8/2005 | Kong |
| 6,934,717 B1 | 8/2005 | James |
| 6,947,928 B2 | 9/2005 | Dettinger et al. |
| 6,983,291 B1 | 1/2006 | Cochrane et al. |
| 6,985,895 B2 | 1/2006 | Witkowski et al. |
| 6,985,899 B2 | 1/2006 | Chan et al. |
| 6,985,904 B1 | 1/2006 | Kaluskar et al. |
| 7,020,649 B2 | 3/2006 | Cochrane et al. |
| 7,024,414 B2 | 4/2006 | Sah et al. |
| 7,031,962 B2 | 4/2006 | Moses |
| 7,047,484 B1 * | 5/2006 | Becker ............ G06Q 10/10 709/203 |
| 7,058,657 B1 | 6/2006 | Berno |
| 7,089,228 B2 | 8/2006 | Arnold et al. |
| 7,089,245 B1 | 8/2006 | George et al. |
| 7,096,216 B2 | 8/2006 | Anonsen |
| 7,099,927 B2 | 8/2006 | Cudd et al. |
| 7,103,608 B1 | 9/2006 | Ozbutun et al. |
| 7,110,997 B1 | 9/2006 | Turkel et al. |
| 7,127,462 B2 | 10/2006 | Hiraga et al. |
| 7,146,357 B2 | 12/2006 | Suzuki et al. |
| 7,149,742 B1 | 12/2006 | Eastham et al. |
| 7,167,870 B2 | 1/2007 | Avvari et al. |
| 7,171,469 B2 | 1/2007 | Ackaouy et al. |
| 7,174,341 B2 | 2/2007 | Ghukasyan et al. |
| 7,181,686 B1 | 2/2007 | Bahrs |
| 7,188,105 B2 | 3/2007 | Dettinger et al. |
| 7,200,620 B2 | 4/2007 | Gupta |
| 7,216,115 B1 | 5/2007 | Walters et al. |
| 7,216,116 B1 | 5/2007 | Nilsson et al. |
| 7,219,302 B1 | 5/2007 | O'Shaughnessy et al. |
| 7,225,189 B1 | 5/2007 | McCormack et al. |
| 7,254,808 B2 | 8/2007 | Trappen et al. |
| 7,257,689 B1 | 8/2007 | Baird |
| 7,272,605 B1 | 9/2007 | Hinshaw et al. |
| 7,308,580 B2 | 12/2007 | Nelson et al. |
| 7,316,003 B1 | 1/2008 | Dulepet et al. |
| 7,330,969 B2 | 2/2008 | Harrison et al. |
| 7,333,941 B1 | 2/2008 | Choi |
| 7,343,585 B1 | 3/2008 | Lau et al. |
| 7,350,237 B2 | 3/2008 | Vogel et al. |
| 7,380,242 B2 | 5/2008 | Alaluf |
| 7,401,088 B2 | 7/2008 | Chintakayala et al. |
| 7,426,521 B2 | 9/2008 | Harter |
| 7,430,549 B2 | 9/2008 | Zane et al. |
| 7,433,863 B2 | 10/2008 | Zane et al. |
| 7,447,865 B2 | 11/2008 | Uppala et al. |
| 7,478,094 B2 | 1/2009 | Ho et al. |
| 7,484,096 B1 | 1/2009 | Garg et al. |
| 7,493,311 B1 | 2/2009 | Cutsinger et al. |
| 7,506,055 B2 | 3/2009 | McClain et al. |
| 7,529,734 B2 | 5/2009 | Dirisala |
| 7,529,750 B2 | 5/2009 | Bair |
| 7,542,958 B1 | 6/2009 | Warren et al. |
| 7,552,223 B1 | 6/2009 | Ackaouy et al. |
| 7,596,550 B2 * | 9/2009 | Mordvinov ....... G06F 16/24524 |
| 7,610,351 B1 | 10/2009 | Gollapudi et al. |
| 7,620,687 B2 | 11/2009 | Chen et al. |
| 7,624,126 B2 | 11/2009 | Pizzo et al. |
| 7,627,603 B2 | 12/2009 | Rosenblum et al. |
| 7,661,141 B2 | 2/2010 | Dutta et al. |
| 7,664,778 B2 | 2/2010 | Yagoub et al. |
| 7,672,275 B2 | 3/2010 | Yajnik et al. |
| 7,680,782 B2 | 3/2010 | Chen et al. |
| 7,711,716 B2 | 5/2010 | Stonecipher |
| 7,711,740 B2 | 5/2010 | Minore et al. |
| 7,711,788 B2 | 5/2010 | Ran et al. |
| 7,747,640 B2 | 6/2010 | Dettinger et al. |
| 7,761,444 B2 | 7/2010 | Zhang et al. |
| 7,797,356 B2 | 9/2010 | Iyer et al. |
| 7,827,204 B2 | 11/2010 | Heinzel et al. |
| 7,827,403 B2 | 11/2010 | Wong et al. |
| 7,827,523 B2 | 11/2010 | Ahmed et al. |
| 7,882,121 B2 | 2/2011 | Bruno et al. |
| 7,882,132 B2 | 2/2011 | Ghatare |

(56) References Cited

U.S. PATENT DOCUMENTS

| | | | |
|---|---|---|---|
| 7,895,191 B2 * | 2/2011 | Colossi | G06F 16/24542 |
| | | | 707/717 |
| 7,904,487 B2 | 3/2011 | Ghatare | |
| 7,908,259 B2 | 3/2011 | Branscome et al. | |
| 7,908,266 B2 | 3/2011 | Zeringue et al. | |
| 7,930,412 B2 | 4/2011 | Yeap et al. | |
| 7,966,311 B2 | 6/2011 | Haase | |
| 7,966,312 B2 | 6/2011 | Nolan et al. | |
| 7,966,343 B2 | 6/2011 | Yang et al. | |
| 7,970,777 B2 | 6/2011 | Saxena et al. | |
| 7,979,431 B2 | 7/2011 | Qazi et al. | |
| 7,984,043 B1 | 7/2011 | Waas | |
| 8,019,795 B2 | 9/2011 | Anderson et al. | |
| 8,027,293 B2 | 9/2011 | Spaur et al. | |
| 8,032,525 B2 | 10/2011 | Bowers et al. | |
| 8,037,542 B2 | 10/2011 | Taylor et al. | |
| 8,046,394 B1 | 10/2011 | Shatdal | |
| 8,046,749 B1 | 10/2011 | Owen et al. | |
| 8,055,672 B2 | 11/2011 | Djugash et al. | |
| 8,060,484 B2 | 11/2011 | Bandera et al. | |
| 8,171,018 B2 | 5/2012 | Zane et al. | |
| 8,180,789 B1 | 5/2012 | Wasserman et al. | |
| 8,196,121 B2 | 6/2012 | Peshansky et al. | |
| 8,209,356 B1 | 6/2012 | Roesler | |
| 8,286,189 B2 | 10/2012 | Kukreja et al. | |
| 8,321,833 B2 | 11/2012 | Langworthy et al. | |
| 8,332,435 B2 | 12/2012 | Ballard et al. | |
| 8,359,305 B1 | 1/2013 | Burke et al. | |
| 8,375,127 B1 | 2/2013 | Lita | |
| 8,380,757 B1 | 2/2013 | Bailey et al. | |
| 8,418,142 B2 | 4/2013 | Ao et al. | |
| 8,433,701 B2 | 4/2013 | Sargeant et al. | |
| 8,458,218 B2 | 6/2013 | Wildermuth | |
| 8,473,897 B2 | 6/2013 | Box et al. | |
| 8,478,713 B2 | 7/2013 | Cotner et al. | |
| 8,515,942 B2 | 8/2013 | Marum et al. | |
| 8,543,620 B2 | 9/2013 | Ching | |
| 8,553,028 B1 | 10/2013 | Urbach | |
| 8,555,263 B2 | 10/2013 | Allen et al. | |
| 8,560,502 B2 | 10/2013 | Vora | |
| 8,595,151 B2 | 11/2013 | Hao et al. | |
| 8,601,016 B2 | 12/2013 | Briggs et al. | |
| 8,621,424 B2 * | 12/2013 | Kejariwal | G06F 8/41 |
| | | | 717/106 |
| 8,631,034 B1 | 1/2014 | Peloski | |
| 8,635,251 B1 * | 1/2014 | Chan | G06F 16/21 |
| | | | 707/803 |
| 8,650,182 B2 | 2/2014 | Murthy | |
| 8,660,869 B2 | 2/2014 | MacIntyre et al. | |
| 8,676,863 B1 | 3/2014 | Connell et al. | |
| 8,683,488 B2 | 3/2014 | Kukreja et al. | |
| 8,713,518 B2 | 4/2014 | Pointer et al. | |
| 8,719,252 B2 | 5/2014 | Miranker et al. | |
| 8,725,707 B2 | 5/2014 | Chen et al. | |
| 8,726,254 B2 | 5/2014 | Rohde et al. | |
| 8,745,014 B2 | 6/2014 | Travis | |
| 8,745,510 B2 | 6/2014 | D'Alo' et al. | |
| 8,751,823 B2 | 6/2014 | Myles et al. | |
| 8,768,961 B2 | 7/2014 | Krishnamurthy | |
| 8,788,254 B2 | 7/2014 | Peloski | |
| 8,793,243 B2 | 7/2014 | Weyerhaeuser et al. | |
| 8,805,875 B1 * | 8/2014 | Bawcom | G06F 16/245 |
| | | | 707/770 |
| 8,805,947 B1 | 8/2014 | Kuzkin et al. | |
| 8,806,133 B2 | 8/2014 | Hay et al. | |
| 8,812,625 B1 | 8/2014 | Chitilian et al. | |
| 8,838,656 B1 | 9/2014 | Cheriton | |
| 8,855,999 B1 | 10/2014 | Elliot | |
| 8,863,156 B1 | 10/2014 | Lepanto et al. | |
| 8,874,512 B2 | 10/2014 | Jin et al. | |
| 8,880,569 B2 | 11/2014 | Draper et al. | |
| 8,880,787 B1 | 11/2014 | Kimmel et al. | |
| 8,881,121 B2 | 11/2014 | Ali | |
| 8,886,631 B2 | 11/2014 | Abadi et al. | |
| 8,903,717 B2 | 12/2014 | Elliot | |
| 8,903,842 B2 | 12/2014 | Bloesch et al. | |
| 8,922,579 B2 | 12/2014 | Mi et al. | |
| 8,924,384 B2 | 12/2014 | Driesen et al. | |
| 8,930,892 B2 | 1/2015 | Pointer et al. | |
| 8,954,418 B2 | 2/2015 | Faerber et al. | |
| 8,959,495 B2 | 2/2015 | Chafi et al. | |
| 8,996,864 B2 | 3/2015 | Maigne et al. | |
| 9,031,930 B2 | 5/2015 | Valentin | |
| 9,077,611 B2 | 7/2015 | Cordray et al. | |
| 9,122,765 B1 | 9/2015 | Chen | |
| 9,177,079 B1 * | 11/2015 | Ramachandran | G06F 16/8358 |
| 9,195,712 B2 | 11/2015 | Freedman et al. | |
| 9,298,768 B2 | 3/2016 | Varakin et al. | |
| 9,311,357 B2 | 4/2016 | Ramesh et al. | |
| 9,372,671 B2 | 6/2016 | Balan et al. | |
| 9,384,184 B2 | 7/2016 | Cervantes et al. | |
| 9,477,702 B1 * | 10/2016 | Ramachandran | G06F 16/2393 |
| 9,612,959 B2 | 4/2017 | Caudy et al. | |
| 9,613,018 B2 | 4/2017 | Zeldis et al. | |
| 9,613,109 B2 | 4/2017 | Wright et al. | |
| 9,619,210 B2 | 4/2017 | Kent et al. | |
| 9,633,060 B2 | 4/2017 | Caudy et al. | |
| 9,639,570 B2 | 5/2017 | Wright et al. | |
| 9,672,238 B2 | 6/2017 | Wright et al. | |
| 9,679,006 B2 | 6/2017 | Wright et al. | |
| 9,690,821 B2 | 6/2017 | Wright et al. | |
| 9,710,511 B2 | 7/2017 | Wright et al. | |
| 9,760,591 B2 | 9/2017 | Caudy et al. | |
| 9,805,084 B2 | 10/2017 | Wright et al. | |
| 9,832,068 B2 | 11/2017 | McSherry et al. | |
| 9,836,494 B2 | 12/2017 | Caudy et al. | |
| 9,836,495 B2 | 12/2017 | Wright | |
| 9,886,469 B2 | 2/2018 | Kent et al. | |
| 9,898,496 B2 | 2/2018 | Caudy et al. | |
| 9,934,266 B2 | 4/2018 | Wright et al. | |
| 10,002,153 B2 | 6/2018 | Teodorescu et al. | |
| 10,002,154 B1 * | 6/2018 | Kent, IV | G06F 16/21 |
| 10,002,155 B1 | 6/2018 | Caudy et al. | |
| 10,003,673 B2 | 6/2018 | Caudy et al. | |
| 10,019,138 B2 | 7/2018 | Zeldis et al. | |
| 10,069,943 B2 | 9/2018 | Teodorescu et al. | |
| 2002/0002576 A1 | 1/2002 | Wollrath et al. | |
| 2002/0007331 A1 | 1/2002 | Lo et al. | |
| 2002/0054587 A1 | 5/2002 | Baker et al. | |
| 2002/0065981 A1 | 5/2002 | Jenne et al. | |
| 2002/0129168 A1 | 9/2002 | Kanai et al. | |
| 2002/0156722 A1 | 10/2002 | Greenwood | |
| 2003/0004952 A1 | 1/2003 | Nixon et al. | |
| 2003/0061216 A1 | 3/2003 | Moses | |
| 2003/0074400 A1 | 4/2003 | Brooks et al. | |
| 2003/0110416 A1 | 6/2003 | Morrison et al. | |
| 2003/0167261 A1 | 9/2003 | Grust et al. | |
| 2003/0182261 A1 | 9/2003 | Patterson | |
| 2003/0208484 A1 | 11/2003 | Chang et al. | |
| 2003/0208505 A1 | 11/2003 | Mullins et al. | |
| 2003/0233632 A1 | 12/2003 | Aigen et al. | |
| 2004/0002961 A1 | 1/2004 | Dettinger et al. | |
| 2004/0015566 A1 | 1/2004 | Anderson et al. | |
| 2004/0076155 A1 | 4/2004 | Yajnik et al. | |
| 2004/0111492 A1 | 6/2004 | Nakahara et al. | |
| 2004/0148630 A1 | 7/2004 | Choi | |
| 2004/0186813 A1 | 9/2004 | Tedesco et al. | |
| 2004/0216150 A1 | 10/2004 | Scheifler et al. | |
| 2004/0220923 A1 | 11/2004 | Mica | |
| 2004/0254876 A1 | 12/2004 | Coval et al. | |
| 2005/0015490 A1 | 1/2005 | Saare et al. | |
| 2005/0060693 A1 | 3/2005 | Robison et al. | |
| 2005/0097447 A1 | 5/2005 | Serra et al. | |
| 2005/0102284 A1 | 5/2005 | Srinivasan et al. | |
| 2005/0102636 A1 | 5/2005 | McKeon et al. | |
| 2005/0131893 A1 | 6/2005 | Glan | |
| 2005/0132384 A1 | 6/2005 | Morrison et al. | |
| 2005/0138624 A1 | 6/2005 | Morrison et al. | |
| 2005/0144189 A1 | 6/2005 | Edwards et al. | |
| 2005/0165866 A1 | 7/2005 | Bohannon et al. | |
| 2005/0198001 A1 | 9/2005 | Cunningham et al. | |
| 2005/0228828 A1 * | 10/2005 | Chandrasekar | G06F 16/81 |
| 2006/0059253 A1 | 3/2006 | Goodman et al. | |
| 2006/0074901 A1 | 4/2006 | Pirahesh et al. | |

(56) References Cited

U.S. PATENT DOCUMENTS

| | | |
|---|---|---|
| 2006/0085490 A1 | 4/2006 | Baron et al. |
| 2006/0100989 A1 | 5/2006 | Chinchwadkar et al. |
| 2006/0101019 A1 | 5/2006 | Nelson et al. |
| 2006/0116983 A1 | 6/2006 | Dettinger et al. |
| 2006/0116999 A1 | 6/2006 | Dettinger et al. |
| 2006/0131383 A1* | 6/2006 | Battagin ............ G06Q 40/04 235/377 |
| 2006/0136361 A1 | 6/2006 | Peri et al. |
| 2006/0173693 A1 | 8/2006 | Arazi et al. |
| 2006/0195460 A1 | 8/2006 | Nori et al. |
| 2006/0212847 A1 | 9/2006 | Tarditi et al. |
| 2006/0218123 A1 | 9/2006 | Chowdhuri et al. |
| 2006/0218200 A1 | 9/2006 | Factor et al. |
| 2006/0230016 A1 | 10/2006 | Cunningham et al. |
| 2006/0253311 A1 | 11/2006 | Yin et al. |
| 2006/0271510 A1 | 11/2006 | Harward et al. |
| 2006/0277162 A1 | 12/2006 | Smith |
| 2007/0011211 A1 | 1/2007 | Reeves et al. |
| 2007/0027884 A1 | 2/2007 | Heger et al. |
| 2007/0033518 A1 | 2/2007 | Kenna et al. |
| 2007/0073765 A1 | 3/2007 | Chen |
| 2007/0101252 A1 | 5/2007 | Chamberlain et al. |
| 2007/0113014 A1* | 5/2007 | Manolov ............ G06F 12/121 711/133 |
| 2007/0116287 A1 | 5/2007 | Rasizade et al. |
| 2007/0169003 A1 | 7/2007 | Branda et al. |
| 2007/0198479 A1 | 8/2007 | Cai et al. |
| 2007/0256060 A1 | 11/2007 | Ryu et al. |
| 2007/0258508 A1 | 11/2007 | Werb et al. |
| 2007/0271280 A1 | 11/2007 | Chandasekaran |
| 2007/0294217 A1 | 12/2007 | Chen et al. |
| 2007/0299822 A1 | 12/2007 | Jopp et al. |
| 2008/0022136 A1 | 1/2008 | Mattsson et al. |
| 2008/0033907 A1 | 2/2008 | Woehler et al. |
| 2008/0034084 A1 | 2/2008 | Pandya |
| 2008/0046804 A1 | 2/2008 | Rui et al. |
| 2008/0072150 A1 | 3/2008 | Chan et al. |
| 2008/0097748 A1* | 4/2008 | Haley ............ G06F 17/2785 704/9 |
| 2008/0120283 A1 | 5/2008 | Liu et al. |
| 2008/0155565 A1 | 6/2008 | Poduri |
| 2008/0168135 A1 | 7/2008 | Redlich et al. |
| 2008/0172639 A1 | 7/2008 | Keysar et al. |
| 2008/0235238 A1 | 9/2008 | Jalobeanu et al. |
| 2008/0263179 A1 | 10/2008 | Buttner et al. |
| 2008/0276241 A1 | 11/2008 | Bajpai et al. |
| 2008/0319951 A1 | 12/2008 | Ueno et al. |
| 2009/0019029 A1 | 1/2009 | Tommaney et al. |
| 2009/0022095 A1 | 1/2009 | Spaur et al. |
| 2009/0024615 A1 | 1/2009 | Pedro et al. |
| 2009/0037391 A1 | 2/2009 | Agrawal et al. |
| 2009/0037500 A1* | 2/2009 | Kirshenbaum ....... G06F 16/137 |
| 2009/0055370 A1 | 2/2009 | Dagum et al. |
| 2009/0083215 A1 | 3/2009 | Burger |
| 2009/0089312 A1 | 4/2009 | Chi et al. |
| 2009/0248902 A1 | 10/2009 | Blue |
| 2009/0254516 A1 | 10/2009 | Meiyyappan et al. |
| 2009/0271472 A1 | 10/2009 | Scheifler et al. |
| 2009/0300770 A1 | 12/2009 | Rowney et al. |
| 2009/0319058 A1 | 12/2009 | Rovaglio et al. |
| 2009/0319484 A1 | 12/2009 | Golbandi et al. |
| 2009/0327242 A1 | 12/2009 | Brown et al. |
| 2010/0023952 A1 | 1/2010 | Sandoval et al. |
| 2010/0036801 A1 | 2/2010 | Pirvali et al. |
| 2010/0042587 A1 | 2/2010 | Johnson et al. |
| 2010/0047760 A1 | 2/2010 | Best et al. |
| 2010/0049715 A1 | 2/2010 | Jacobsen et al. |
| 2010/0070721 A1 | 3/2010 | Pugh et al. |
| 2010/0114890 A1 | 5/2010 | Hagar et al. |
| 2010/0161555 A1 | 6/2010 | Nica et al. |
| 2010/0186082 A1 | 7/2010 | Ladki et al. |
| 2010/0199161 A1 | 8/2010 | Aureglia et al. |
| 2010/0205017 A1 | 8/2010 | Sichelman et al. |
| 2010/0205351 A1 | 8/2010 | Wiener et al. |
| 2010/0281005 A1 | 11/2010 | Carlin et al. |
| 2010/0281071 A1 | 11/2010 | Ben-Zvi et al. |
| 2011/0126110 A1 | 5/2011 | Vilke et al. |
| 2011/0126154 A1 | 5/2011 | Boehler et al. |
| 2011/0153603 A1 | 6/2011 | Adiba et al. |
| 2011/0161378 A1 | 6/2011 | Williamson |
| 2011/0167020 A1 | 7/2011 | Yang et al. |
| 2011/0178984 A1 | 7/2011 | Talius et al. |
| 2011/0194563 A1 | 8/2011 | Shen et al. |
| 2011/0219020 A1 | 9/2011 | Oks et al. |
| 2011/0314019 A1 | 12/2011 | Peris |
| 2012/0110030 A1 | 5/2012 | Pomponio |
| 2012/0144234 A1 | 6/2012 | Clark et al. |
| 2012/0159303 A1 | 6/2012 | Friedrich et al. |
| 2012/0191446 A1 | 7/2012 | Binsztok et al. |
| 2012/0192096 A1 | 7/2012 | Bowman et al. |
| 2012/0197868 A1 | 8/2012 | Fauser et al. |
| 2012/0209886 A1 | 8/2012 | Henderson |
| 2012/0215741 A1 | 8/2012 | Poole et al. |
| 2012/0221528 A1 | 8/2012 | Renkes |
| 2012/0246052 A1 | 9/2012 | Taylor et al. |
| 2012/0254143 A1 | 10/2012 | Varma et al. |
| 2012/0259759 A1 | 10/2012 | Crist et al. |
| 2012/0296846 A1 | 11/2012 | Teeter |
| 2013/0041946 A1 | 2/2013 | Joel et al. |
| 2013/0080514 A1 | 3/2013 | Gupta et al. |
| 2013/0086107 A1 | 4/2013 | Genochio et al. |
| 2013/0166551 A1 | 6/2013 | Wong et al. |
| 2013/0166556 A1 | 6/2013 | Baeumges et al. |
| 2013/0173667 A1 | 7/2013 | Soderberg et al. |
| 2013/0179460 A1 | 7/2013 | Cervantes et al. |
| 2013/0185619 A1 | 7/2013 | Ludwig |
| 2013/0191370 A1 | 7/2013 | Chen et al. |
| 2013/0198232 A1 | 8/2013 | Shamgunov et al. |
| 2013/0226959 A1 | 8/2013 | Dittrich et al. |
| 2013/0246560 A1 | 9/2013 | Feng et al. |
| 2013/0263123 A1 | 10/2013 | Zhou et al. |
| 2013/0290243 A1 | 10/2013 | Hazel et al. |
| 2013/0304725 A1 | 11/2013 | Nee et al. |
| 2013/0304744 A1 | 11/2013 | McSherry et al. |
| 2013/0311352 A1 | 11/2013 | Kayanuma et al. |
| 2013/0311488 A1 | 11/2013 | Erdogan et al. |
| 2013/0318129 A1 | 11/2013 | Vingralek et al. |
| 2013/0346365 A1 | 12/2013 | Kan et al. |
| 2014/0019494 A1 | 1/2014 | Tang |
| 2014/0026121 A1 | 1/2014 | Jackson et al. |
| 2014/0040203 A1 | 2/2014 | Lu et al. |
| 2014/0046638 A1 | 2/2014 | Peloski |
| 2014/0059646 A1 | 2/2014 | Hannel et al. |
| 2014/0082724 A1 | 3/2014 | Pearson et al. |
| 2014/0136521 A1 | 5/2014 | Pappas |
| 2014/0143123 A1 | 5/2014 | Banke et al. |
| 2014/0149997 A1 | 5/2014 | Kukreja et al. |
| 2014/0156618 A1 | 6/2014 | Castellano |
| 2014/0173023 A1 | 6/2014 | Varney et al. |
| 2014/0181036 A1 | 6/2014 | Dhamankar et al. |
| 2014/0181081 A1 | 6/2014 | Veldhuizen |
| 2014/0188924 A1 | 7/2014 | Ma et al. |
| 2014/0195558 A1 | 7/2014 | Murthy et al. |
| 2014/0201194 A1 | 7/2014 | Reddy et al. |
| 2014/0215446 A1 | 7/2014 | Araya et al. |
| 2014/0222768 A1 | 8/2014 | Rambo et al. |
| 2014/0229506 A1 | 8/2014 | Lee |
| 2014/0229874 A1 | 8/2014 | Strauss |
| 2014/0244687 A1 | 8/2014 | Shmueli et al. |
| 2014/0279810 A1 | 9/2014 | Mann et al. |
| 2014/0280522 A1 | 9/2014 | Watte |
| 2014/0282227 A1 | 9/2014 | Nixon et al. |
| 2014/0282444 A1 | 9/2014 | Araya et al. |
| 2014/0282540 A1 | 9/2014 | Bonnet et al. |
| 2014/0289700 A1* | 9/2014 | Srinivasaraghavan ... G06F 8/34 717/106 |
| 2014/0292765 A1 | 10/2014 | Maruyama et al. |
| 2014/0297611 A1 | 10/2014 | Abbour et al. |
| 2014/0317084 A1 | 10/2014 | Chaudhry et al. |
| 2014/0324821 A1 | 10/2014 | Meiyyappan et al. |
| 2014/0330700 A1 | 11/2014 | Studnitzer et al. |
| 2014/0330807 A1 | 11/2014 | Weyerhaeuser et al. |
| 2014/0344186 A1 | 11/2014 | Nadler |
| 2014/0344391 A1 | 11/2014 | Varney et al. |

(56) References Cited

U.S. PATENT DOCUMENTS

| | | |
|---|---|---|
| 2014/0358892 A1 | 12/2014 | Nizami et al. |
| 2014/0359574 A1 | 12/2014 | Beckwith et al. |
| 2014/0372482 A1 | 12/2014 | Martin et al. |
| 2014/0380051 A1 | 12/2014 | Edward et al. |
| 2015/0019516 A1 | 1/2015 | Wein et al. |
| 2015/0026155 A1 | 1/2015 | Martin |
| 2015/0032789 A1 | 1/2015 | Nguyen et al. |
| 2015/0067640 A1 | 3/2015 | Booker et al. |
| 2015/0074066 A1 | 3/2015 | Li et al. |
| 2015/0082218 A1 | 3/2015 | Affoneh et al. |
| 2015/0088894 A1 | 3/2015 | Czarlinska et al. |
| 2015/0095381 A1 | 4/2015 | Chen et al. |
| 2015/0120261 A1 | 4/2015 | Giannacopoulos et al. |
| 2015/0127599 A1 | 5/2015 | Schiebeler |
| 2015/0154262 A1 | 6/2015 | Yang et al. |
| 2015/0172117 A1 | 6/2015 | Dolinsky et al. |
| 2015/0188778 A1 | 7/2015 | Asayag et al. |
| 2015/0205588 A1 | 7/2015 | Bates et al. |
| 2015/0205589 A1 | 7/2015 | Dally |
| 2015/0254298 A1 | 9/2015 | Bourbonnais et al. |
| 2015/0304182 A1 | 10/2015 | Brodsky et al. |
| 2015/0317359 A1 | 11/2015 | Tran et al. |
| 2015/0356157 A1 | 12/2015 | Anderson et al. |
| 2016/0026383 A1 | 1/2016 | Lee et al. |
| 2016/0026442 A1 | 1/2016 | Chhaparia |
| 2016/0065670 A1 | 3/2016 | Kimmel et al. |
| 2016/0085772 A1 | 3/2016 | Vermeulen et al. |
| 2016/0092599 A1 | 3/2016 | Barsness et al. |
| 2016/0103897 A1* | 4/2016 | Nysewander ......... G06F 16/254 707/602 |
| 2016/0125018 A1 | 5/2016 | Tomoda et al. |
| 2016/0147748 A1* | 5/2016 | Florendo ............... G06F 16/214 707/809 |
| 2016/0171070 A1 | 6/2016 | Hrle et al. |
| 2016/0179754 A1 | 6/2016 | Borza et al. |
| 2016/0253294 A1 | 9/2016 | Allen et al. |
| 2016/0316038 A1 | 10/2016 | Jolfaei |
| 2016/0335281 A1* | 11/2016 | Teodorescu ......... G06F 16/9024 |
| 2016/0335304 A1 | 11/2016 | Teodorescu et al. |
| 2016/0335317 A1 | 11/2016 | Teodorescu et al. |
| 2016/0335323 A1 | 11/2016 | Teodorescu et al. |
| 2016/0335330 A1 | 11/2016 | Teodorescu et al. |
| 2016/0335361 A1 | 11/2016 | Teodorescu et al. |
| 2017/0032016 A1* | 2/2017 | Zinner ................. G06Q 10/063 |
| 2017/0161514 A1 | 6/2017 | Dettinger et al. |
| 2017/0177677 A1 | 6/2017 | Wright et al. |
| 2017/0185385 A1 | 6/2017 | Kent et al. |
| 2017/0192910 A1 | 7/2017 | Wright et al. |
| 2017/0206229 A1 | 7/2017 | Caudy et al. |
| 2017/0206256 A1 | 7/2017 | Tsirogiannis et al. |
| 2017/0235794 A1 | 8/2017 | Wright et al. |
| 2017/0235798 A1 | 8/2017 | Wright et al. |
| 2017/0249350 A1 | 8/2017 | Wright et al. |
| 2017/0270150 A1 | 9/2017 | Wright et al. |
| 2017/0316046 A1 | 11/2017 | Caudy et al. |
| 2017/0329740 A1 | 11/2017 | Crawford et al. |
| 2017/0357708 A1* | 12/2017 | Ramachandran ... G06F 16/2264 |
| 2017/0359415 A1 | 12/2017 | Venkatraman et al. |
| 2018/0004796 A1 | 1/2018 | Kent et al. |
| 2018/0011891 A1 | 1/2018 | Wright et al. |
| 2018/0052879 A1 | 2/2018 | Wright |

FOREIGN PATENT DOCUMENTS

| | | |
|---|---|---|
| EP | 1198769 B1 | 6/2008 |
| EP | 2199961 A1 | 6/2010 |
| EP | 2423816 A1 | 2/2012 |
| EP | 2743839 A1 | 6/2014 |
| GB | 2397906 A | 8/2004 |
| RU | 2421798 | 6/2011 |
| WO | 2000000879 A2 | 1/2000 |
| WO | 2001079964 A2 | 10/2001 |
| WO | 2011120161 A1 | 10/2011 |
| WO | 2012136627 A1 | 10/2012 |
| WO | 2014026220 A1 | 2/2014 |
| WO | 2014143208 A1 | 9/2014 |
| WO | 2016183563 A1 | 11/2016 |

OTHER PUBLICATIONS

Advisory Action dated Apr. 20, 2017, in U.S. Appl. No. 15/154,980.
Advisory Action dated Apr. 6, 2017, in U.S. Appl. No. 15/154,995.
Advisory Action dated Dec. 21, 2017, in U.S. Appl. No. 15/154,984.
Advisory Action dated Mar. 31, 2017, in U.S. Appl. No. 15/154,996.
Advisory Action dated May 3, 2017, in U.S. Appl. No. 15/154,993.
Breitbart, Update Propagation Protocols for Replicated Databases, SIGMOD '99 Philadelphia PA, 1999, pp. 97-108.
Corrected Notice of Allowability dated Aug. 9, 2017, in U.S. Appl. No. 15/154,980.
Corrected Notice of Allowability dated Jul. 31, 2017, in U.S. Appl. No. 15/154,999.
Corrected Notice of Allowability dated Mar. 10, 2017, in U.S. Appl. No. 15/154,979.
Corrected Notice of Allowability dated Oct. 26, 2017, in U.S. Appl. No. 15/610,162.
Decision on Pre-Appeal Conference Request dated Nov. 20, 2017, in U.S. Appl. No. 15/154,997.
Final Office Action dated Apr. 10, 2017, in U.S. Appl. No. 15/155,006.
Final Office Action dated Dec. 29, 2017, in U.S. Appl. No. 15/154,974.
Final Office Action dated Feb. 24, 2017, in U.S. Appl. No. 15/154,993.
Final Office Action dated Jul. 27, 2017, in U.S. Appl. No. 15/154,993.
Final Office Action dated Jun. 23, 2017, in U.S. Appl. No. 15/154,997.
Final Office Action dated Mar. 1, 2017, in U.S. Appl. No. 15/154,975.
Final Office Action dated Mar. 13, 2017, in U.S. Appl. No. 15/155,012.
Final Office Action dated Mar. 31, 2017, in U.S. Appl. No. 15/155,005.
Final Office Action dated May 15, 2017, in U.S. Appl. No. 15/155,010.
Final Office Action dated May 4, 2017, in U.S. Appl. No. 15/155,009.
Kramer, The Combining DAG: A Technique for Parallel Data Flow Analysis, IEEE Transactions on Parallel and Distributed Systems, vol. 5, No. 8, Aug. 1994, pp. 805-813.
Non-final Office Action dated Apr. 19, 2017, in U.S. Appl. No. 15/154,974.
Non-final Office Action dated Aug. 14, 2017, in U.S. Appl. No. 15/464,314.
Non-final Office Action dated Dec. 13, 2017, in U.S. Appl. No. 15/608,963.
Non-final Office Action dated Dec. 28, 2017, in U.S. Appl. No. 15/154,996.
Non-final Office Action dated Dec. 28, 2017, in U.S. Appl. No. 15/796,230.
Non-final Office Action dated Feb. 12, 2018, in U.S. Appl. No. 15/466,836.
Non-final Office Action dated Feb. 15, 2018, in U.S. Appl. No. 15/813,112.
Non-final Office Action dated Feb. 28, 2018, in U.S. Appl. No. 15/813,119.
Non-final Office Action dated Jan. 4, 2018, in U.S. Appl. No. 15/583,777.
Non-final Office Action dated Jul. 27, 2017, in U.S. Appl. No. 15/154,995.
Non-final Office Action dated Mar. 2, 2017, in U.S. Appl. No. 15/154,984.
Non-final Office Action dated Mar. 20, 2018, in U.S. Appl. No. 15/155,006.
Non-final Office Action dated Nov. 15, 2017, in U.S. Appl. No. 15/654,461.
Non-final Office Action dated Nov. 21, 2017, in U.S. Appl. No. 15/155,005.
Non-final Office Action dated Nov. 30, 2017, in U.S. Appl. No. 15/155,012.
Non-final Office Action dated Oct. 5, 2017, in U.S. Appl. No. 15/428,145.
Notice of Allowance dated Feb. 12, 2018, in U.S. Appl. No. 15/813,142.
Notice of Allowance dated Feb. 26, 2018, in U.S. Appl. No. 15/428,145.

(56) References Cited

OTHER PUBLICATIONS

Notice of Allowance dated Feb. 28, 2017, in U.S. Appl. No. 15/154,990.
Notice of Allowance dated Jul. 28, 2017, in U.S. Appl. No. 15/155,009.
Notice of Allowance dated Jun. 19, 2017, in U.S. Appl. No. 15/154,980.
Notice of Allowance dated Jun. 20, 2017, in U.S. Appl. No. 15/154,975.
Notice of Allowance dated Mar. 1, 2018, in U.S. Appl. No. 15/464,314.
Notice of Allowance dated Mar. 2, 2017, in U.S. Appl. No. 15/154,998.
Notice of Allowance dated Mar. 31, 2017, in U.S. Appl. No. 15/154,998.
Notice of Allowance dated May 10, 2017, in U.S. Appl. No. 15/154,988.
Notice of Allowance dated Nov. 17, 2017, in U.S. Appl. No. 15/154,993.
Final Office Action dated Aug. 10, 2018, in U.S. Appl. No. 15/796,230.
Final Office Action dated Aug. 2, 2018, in U.S. Appl. No. 15/154,996.
Final Office Action dated Aug. 28, 2018, in U.S. Appl. No. 15/813,119.
Final Office Action dated Jun. 18, 2018, in U.S. Appl. No. 15/155,005.
Final Office Action dated May 18, 2018, in U.S. Appl. No. 15/654,461.
Non-final Office Action dated Apr. 12, 2018, in U.S. Appl. No. 15/154,997.
Non-final Office Action dated Apr. 23, 2018, in U.S. Appl. No. 15/813,127.
Non-final Office Action dated Apr. 5, 2018, in U.S. Appl. No. 15/154,984.
Non-final Office Action dated Aug. 10, 2018, in U.S. Appl. No. 16/004,578.
Non-final Office Action dated Jun. 29, 2018, in U.S. Appl. No. 15/154,974.
Non-final Office Action dated Jun. 8, 2018, in U.S. Appl. No. 15/452,574.
Notice of Allowance dated Apr. 30, 2018, in U.S. Appl. No. 15/155,012.
Notice of Allowance dated Jul. 11, 2018, in U.S. Appl. No. 15/154,995.
Notice of Allowance dated May 4, 2018, in U.S. Appl. No. 15/897,547.
Notice of Allowance dated Sep. 11, 2018, in U.S. Appl. No. 15/608,963.
Hartle, Thom, Conditional Formatting in Excel using CQG's RTD Bate Function (2011), http://news.cqg.com/blogs/excel/2011/05/conditional-formatting-excel-using-cqgs-rtd-bate-function (last visited Apr. 3, 2019).
Azbel, Maria, How to hide and group columns in Excel AbleBits (2014), https://www.ablebits.com/office-addins-blog/2014/08/06/excel-hide-columns/ (last visited Jan. 18, 2019).
Dodge, Mark & Craig Stinson, Microsoft Excel 2010 inside out (2011).
Cheusheve, Svetlana, Excel formulas for conditional formatting based on another cell AbleBits (2014), https://www.ablebits.com/office-addins-blog/2014/06/10/excel-conditional-formatting-formulas/comment-page-6/ (last visited Jan. 14, 2019).
Notice of Allowance dated Oct. 6, 2017, in U.S. Appl. No. 15/610,162.
Sobell, Mark G. "A Practical Guide to Linux, Commands, Editors and Shell Programming." Third Edition, dated Sep. 14, 2012. Retrieved from: http://techbus.safaribooksonline.com/book/operating-systems-and-server-administration/linux/9780133085129.
Jellema, Lucas. "Implementing Cell Highlighting in JSF-based Rich Enterprise Apps (Part 1)", dated Nov. 2008. Retrieved from http://www.oracle.com/technetwork/articles/adf/jellema-adfcellhighlighting-087850.html (last accessed Jun. 16, 2016).
Lou, Yuan. "A Multi-Agent Decision Support System for Stock Trading", IEEE Network, Jan./Feb. 2002. Retreived from http://www.reading.ac.uk/AcaDepts/si/sisweb13/ais/papers/journal12-A%20multi-agent%20Framework.pdf.
Mallet, "Relational Database Support for Spatio-Temporal Data", Technical Report TR 04-21, Sep. 2004, University of Alberta, Department of Computing Science.
Mariyappan, Balakrishnan. "10 Useful Linux Bash_Completion Complete Command Examples (Bash Command Line Completion on Steroids)", dated Dec. 2, 2013. Retrieved from http://www.thegeekstuff.com/2013/12/bash-completion-complete/ (last accessed Jun. 16, 2016).
Murray, Derek G. et al. "Naiad: a timely dataflow system." SOSP '13 Proceedings of the Twenty-Fourth ACM Symposium on Operating Systems Principles. pp. 439-455. Nov. 2013.
Non-final Office Action dated Aug. 12, 2016, in U.S. Appl. No. 15/155,001.
Non-final Office Action dated Aug. 16, 2016, in U.S. Appl. No. 15/154,993.
Non-final Office Action dated Aug. 19, 2016, in U.S. Appl. No. 15/154,991.
Non-final Office Action dated Aug. 25, 2016, in U.S. Appl. No. 15/154,980.
Non-final Office Action dated Aug. 26, 2016, in U.S. Appl. No. 15/154,995.
Non-final Office Action dated Aug. 8, 2016, in U.S. Appl. No. 15/154,983.
Non-final Office Action dated Aug. 8, 2016, in U.S. Appl. No. 15/154,985.
Non-final Office Action dated Feb. 8, 2017, in U.S. Appl. No. 15/154,997.
Non-final Office Action dated Nov. 17, 2016, in U.S. Appl. No. 15/154,999.
Non-final Office Action dated Oct. 13, 2016, in U.S. Appl. No. 15/155,009.
Non-final Office Action dated Oct. 27, 2016, in U.S. Appl. No. 15/155,006.
Non-final Office Action dated Oct. 7, 2016, in U.S. Appl. No. 15/154,998.
Non-final Office Action dated Sep. 1, 2016, in U.S. Appl. No. 15/154,979.
Non-final Office Action dated Sep. 1, 2016, in U.S. Appl. No. 15/155,011.
Non-final Office Action dated Sep. 1, 2016, in U.S. Appl. No. 15/155,012.
Non-final Office Action dated Sep. 14, 2016, in U.S. Appl. No. 15/154,984.
Non-final Office Action dated Sep. 16, 2016, in U.S. Appl. No. 15/154,988.
Non-final Office Action dated Sep. 22, 2016, in U.S. Appl. No. 15/154,987.
Non-final Office Action dated Sep. 26, 2016, in U.S. Appl. No. 15/155,005.
Non-final Office Action dated Sep. 29, 2016, in U.S. Appl. No. 15/154,990.
Non-final Office Action dated Sep. 8, 2016, in U.S. Appl. No. 15/154,975.
Non-final Office Action dated Sep. 9, 2016, in U.S. Appl. No. 15/154,996.
Non-final Office Action dated Sep. 9, 2016, in U.S. Appl. No. 15/155,010.
Notice of Allowance dated Dec. 19, 2016, in U.S. Appl. No. 15/155,001.
Notice of Allowance dated Dec. 22, 2016, in U.S. Appl. No. 15/155,011.
Notice of Allowance dated Dec. 7, 2016, in U.S. Appl. No. 15/154,985.
Notice of Allowance dated Feb. 1, 2017, in U.S. Appl. No. 15/154,988.
Notice of Allowance dated Feb. 14, 2017, in U.S. Appl. No. 15/154,979.
Notice of Allowance dated Jan. 30, 2017, in U.S. Appl. No. 15/154,987.
Notice of Allowance dated Nov. 17, 2016, in U.S. Appl. No. 15/154,991.
Notice of Allowance dated Nov. 21, 2016, in U.S. Appl. No. 15/154,983.

(56) References Cited

OTHER PUBLICATIONS

Notice of Allowance dated Nov. 8, 2016, in U.S. Appl. No. 15/155,007.
Notice of Allowance dated Oct. 11, 2016, in U.S. Appl. No. 15/155,007.
Notice of Allowance dated Oct. 21, 2016, in U.S. Appl. No. 15/154,999.
Palpanas, Themistoklis et al. "Incremental Maintenance for Non-Distributive Aggregate Functions", Proceedings of the 28th VLDB Conference, 2002. Retreived from http://www.vldb.org/conf/2002/S22P04.pdf.
PowerShell Team, Intellisense in Windows PowerShell ISE 3.0, dated Jun. 12, 2012, Windows PowerShell Blog, pp. 1-6 Retrieved: https://biogs.msdn.microsoft.com/powershell/2012/06/12/intellisense-in-windows-powershell-ise-3-0/.
Smith, Ian. "Guide to Using SQL: Computed and Automatic Columns." Rdb Jornal, dated Sep. 2008, retrieved Aug. 15, 2016, retrieved from the Internet <URL: http://www.oracle.com/technetwork/products/rdb/automatic-columns-132042.pdf>.
Wes McKinney & PyData Development Team. "pandas: powerful Python data analysis toolkit, Release 0.16.1" Dated May 11, 2015. Retrieved from: http://pandas.pydata.org/pandas-docs/version/0.16.1/index.html.
Wes McKinney & PyData Development Team. "pandas: powerful Python data analysis toolkit, Release 0.18.1" Dated May 3, 2016. Retrieved from: http://pandas.pydata.org/pandas-docs/version/0.18.1/index.html.
Wu, Buwen et al. "Scalable SPARQL Querying using Path Partitioning", 31st IEEE International Conference on Data Engineering (ICDE 2015), Seoul, Korea, Apr. 13-17, 2015. Retreived from http://imada.sdu.dk/~zhou/papers/icde2015.pdf.
Posey, Brien, "How to Combine PowerShell Cmdlets", Jun. 14, 2013 Redmond the Independent Voice of the Microsoft Community (Year: 2013).
"About Entering Commands in the Command Window", dated Dec. 16, 2015. Retrieved from https://knowledge.autodesk.com/support/autocad/learn-explore/caas/CloudHelp/cloudhelp/2016/ENU/AutoCAD-Core/files/GUID-BB0C3E79-66AF-4557-9140-D31B4CF3C9CF-htm.html (last accessed Jun. 16, 2016).
"Change Data Capture", Oracle Database Online Documentation 11g Release 1 (11.1), dated Apr. 5, 2016. Retrieved from https://web.archive.org/web/20160405032625/http://docs.oracle.com/cd/B28359_01/server.111/b28313/cdc.htm.
"Chapter 24. Query access plans", Tuning Database Performance, DB2 Version 9.5 for Linux, UNIX, and Windows, pp. 301-462, dated Dec. 2010. Retreived from http://public.dhe.ibm.com/ps/products/db2/info/vr95/pdf/en_US/DB2PerfTuneTroubleshoot-db2d3e953.pdf.
"GNU Emacs Manual", dated Apr. 15, 2016, pp. 43-47. Retrieved from https://web.archive.org/web/20160415175915/http://www.gnu.org/software/emacs/manual/html_mono/emacs.html.
"Google Protocol RPC Library Overview", dated Apr. 27, 2016. Retrieved from https://cloud.google.com/appengine/docs/python/tools/protorpc/ (last accessed Jun. 16, 2016).
"IBM—What is HBase?", dated Sep. 6, 2015. Retrieved from https://web.archive.org/web/20150906022050/http://www-01.ibm.com/software/data/infosphere/hadoop/hbase/.
"IBM Informix TimeSeries data management", dated Jan. 18, 2016. Retrieved from https://web.archive.org/web/20160118072141/http://www-01.ibm.com/software/data/informix/timeseries/.
"IBM InfoSphere BigInsights 3.0.0—Importing data from and exporting data to DB2 by using Sqoop", dated Jan. 15, 2015. Retrieved from https://web.archive.org/web/20150115034058/http://www-01.ibm.com/support/knowledgecenter/SSPT3X_3.0.0/com.ibm.swg.im.infosphere.biginsights.import.doc/doc/data_warehouse_sqoop.html.
"Maximize Data Value with Very Large Database Management by SAP Sybase IQ", dated 2013. Retrieved from http://www.sap.com/bin/sapcom/en_us/downloadasset.2013-06-jun-11-11.maximize-data-value-with-very-large-database-management-by-sap-sybase-iq-pdf.html.
"Microsoft Azure—Managing Access Control Lists (ACLs) for Endpoints by using PowerShell", dated Nov. 12, 2014. Retrieved from https://web.archive.org/web/20150110170715/http://msdn.microsoft.com/en-us/library/azure/dn376543.aspx.
"Oracle Big Data Appliance—Perfect Balance Java API", dated Sep. 20, 2015. Retrieved from https://web.archive.org/web/20131220040005/http://docs.oracle.com/cd/E41604_01/doc.22/e41667/toc.htm.
"Oracle Big Data Appliance—X5-2", dated Sep. 6, 2015. Retrieved from https://web.archive.org/web/20150906185409/http://www.oracle.com/technetwork/database/bigdata-appliance/overview/bigdataappliance-datasheet-1883358.pdf.
"Oracle Big Data Appliance Software User's Guide", dated Feb. 2015. Retrieved from https://docs.oracle.com/cd/E55905_01/doc.40/e55814.pdf.
"SAP HANA Administration Guide", dated Mar. 29, 2016, pp. 290-294. Retrieved from https://web.archive.org/web/20160417053656/http://help.sap.com/hana/SAP_HANA_Administration_Guide_en.pdf.
"Sophia Database—Architecture", dated Jan. 18, 2016. Retrieved from https://web.archive.org/web/20160118052919/http://sphia.org/architecture.html.
"Tracking Data Changes", SQL Server 2008 R2, dated Sep. 22, 2015. Retreived from https://web.archive.org/web/20150922000614/https://technet.microsoft.com/en-us/library/bb933994(v=sql.105).aspx.
"Use Formula AutoComplete", dated 2010. Retrieved from https://support.office.com/en-us/article/Use-Formula-AutoComplete-c7c46fa6-3a94-4150-a217-34140c1ee4d9 (last accessed Jun. 16, 2016).
Adelfio et al. "Schema Extraction for Tabular Data on the Web", Proceedings of the VLDB Endowment, vol. 6, No. 6. Apr. 2013. Retrieved from http://www.cs.umd.edu/~hjs/pubs/spreadsheets-vldb13.pdf.
Borror, Jefferey A. "Q for Mortals 2.0", dated Nov. 1, 2011, Retreived from http://code.kx.com/wiki/JB:QforMortals2/contents.
Cheusheva, Svetlana. "How to change the row color based on a cell's value in Excel", dated Oct. 29, 2013. Retrieved from https://www.ablebits.com/office-addins-blog/2013/10/29/excel-change-row-background-color/ (last accessed Jun. 16, 2016).
Ex Parte Quayle Action mailed Aug. 8, 2016, in U.S. Appl. No. 15/154,999.
Final Office Action dated Dec. 19, 2016, in U.S. Appl. No. 15/154,995.
Final Office Action dated Jan. 27, 2017, in U.S. Appl. No. 15/154,980.
Final Office Action dated Jan. 31, 2017, in U.S. Appl. No. 15/154,996.
Gai, Lei et al. "An Efficient Summary Graph Driven Method for RDF Query Processing", dated Oct. 27, 2015. Retreived from http://arxiv.org/pdf/1510.07749.pdf.
International Search Report and Written Opinion dated Aug. 18, 2016, in International Appln. No. PCT/US2016/032582 filed May 14, 2016.
International Search Report and Written Opinion dated Aug. 18, 2016, in International Appln. No. PCT/US2016/032584 filed May 14, 2016.
International Search Report and Written Opinion dated Aug. 18, 2016, in International Appln. No. PCT/US2016/032588 filed May 14, 2016.
International Search Report and Written Opinion dated Aug. 18, 2016, in International Appln. No. PCT/US2016/032593 filed May 14, 2016.
International Search Report and Written Opinion dated Aug. 18, 2016, in International Appln. No. PCT/US2016/032597 filed May 14, 2016.
International Search Report and Written Opinion dated Aug. 18, 2016, in International Appln. No. PCT/US2016/032599 filed May 14, 2016.
International Search Report and Written Opinion dated Aug. 18, 2016, in International Appln. No. PCT/US2016/032605 filed May 14, 2016.

(56) References Cited

OTHER PUBLICATIONS

International Search Report and Written Opinion dated Aug. 25, 2016, in International Appln. No. PCT/US2016/032590 filed May 14, 2016.
International Search Report and Written Opinion dated Aug. 25, 2016, in International Appln. No. PCT/US2016/032592 filed May 14, 2016.
International Search Report and Written Opinion dated Aug. 4, 2016, in International Appln. No. PCT/US2016/032581 filed May 14, 2016.
International Search Report and Written Opinion dated Jul. 28, 2016, in International Appln. No. PCT/US2016/032586 filed May 14, 2016.
International Search Report and Written Opinion dated Jul. 28, 2016, in International Appln. No. PCT/US2016/032587 filed May 14, 2016.
International Search Report and Written Opinion dated Jul. 28, 2016, in International Appln. No. PCT/US2016/032589 filed May 14, 2016.
International Search Report and Written Opinion dated Sep. 1, 2016, in International Appln. No. PCT/US2016/032596 filed May 14, 2016.
International Search Report and Written Opinion dated Sep. 1, 2016, in International Appln. No. PCT/US2016/032598 filed May 14, 2016.
International Search Report and Written Opinion dated Sep. 1, 2016, in International Appln. No. PCT/US2016/032601 filed May 14, 2016.
International Search Report and Written Opinion dated Sep. 1, 2016, in International Appln. No. PCT/US2016/032602 filed May 14, 2016.
International Search Report and Written Opinion dated Sep. 1, 2016, in International Appln. No. PCT/US2016/032607 filed May 14, 2016.
International Search Report and Written Opinion dated Sep. 15, 2016, in International Appln. No. PCT/US2016/032591 filed May 14, 2016.
International Search Report and Written Opinion dated Sep. 15, 2016, in International Appln. No. PCT/US2016/032594 filed May 14, 2016.
International Search Report and Written Opinion dated Sep. 15, 2016, in International Appln. No. PCT/US2016/032600 filed May 14, 2016.
International Search Report and Written Opinion dated Sep. 29, 2016, in International Appln. No. PCT/US2016/032595 filed May 14, 2016.
International Search Report and Written Opinion dated Sep. 29, 2016, in International Appln. No. PCT/US2016/032606 filed May 14, 2016.
International Search Report and Written Opinion dated Sep. 8, 2016, in International Appln. No. PCT/US2016/032603 filed May 14, 2016.
International Search Report and Written Opinion dated Sep. 8, 2016, in International Appln. No. PCT/US2016/032604 filed May 14, 2016.

* cited by examiner

| Source | | |
|---|---|---|
| A | B | C |
| 1 | 10 | ZZ |
| 2 | 20 | YY |
| 3 | 30 | XX |
| 4 | 40 | ZZ |
| 5 | 50 | WW |

FIG. 5A by()

| A | B | C |
|---|---|---|
| {1,2,3,4,5} | {10,20,30,40,50} | {ZZ,YY,XX,ZZ,WW} |

FIG. 5B by("C")

| A | B | C |
|---|---|---|
| {1,4} | {10,40} | ZZ |
| {2} | {20} | YY |
| {3} | {30} | XX |
| {5} | {50} | WW |

FIG. 5C by("Parity=A%2")

| Parity | A | B | C |
|---|---|---|---|
| 1 | {1,3,5} | {10,30,50} | {ZZ,XX,WW} |
| 0 | {2,4} | {20,40} | {YY,ZZ} |

FIG. 5D lastBy("Parity=A%2")

| Parity | A | B | C |
|---|---|---|---|
| 1 | 5 | 50 | WW |
| 0 | 4 | 40 | ZZ |

FIG. 5E view("A","B").avgBy()

| A | B |
|---|---|
| 3 | 30 |

FIG. 5F view("A","B").sumBy("Parity=A%2")

| Parity | A | B |
|---|---|---|
| 1 | 9 | 90 |
| 0 | 6 | 60 |

FIG. 5G applyToAllBy( " 'The second element is ' + each[1] " ,"Parity=A%2")

| Parity | A | B | C |
|---|---|---|---|
| 1 | The second element is 3 | The second element is 30 | The second element is C |
| 0 | The second element is 4 | The second element is 40 | The second element is AAPL |

FIG. 5H trades1

| Timestamp | USym | Sym | Size | Price |
|---|---|---|---|---|
| 12:01:34 | ABC | ABC_2016_02_19_100.00_P | 10 | 0.30 |
| 12:01:48 | ABC | ABC_2016_02_19_90.00_P | 32 | 0.05 |
| 12:01:54 | XYZ | XYZ_2016_07_15_45.00_C | 12 | 0.15 |
| 12:02:14 | ABC | ABC_2016_02_19_110.00_C | 15 | 0.04 |
| 12:02:37 | XYZ | XYZ_2016_07_15_47.00_C | 20 | 0.01 |

FIG. 6A

```
tradeStats = trades1.by(AggCombo(
      AggMin("FirstTrade=Timestamp"),
      AggMax("LastTrade=Timestamp"),
      AggSum("Size"),
      AggAvg("AvgSize=Size")
      ), "USym")
```

FIG. 6B tradeStats

| USym | FirstTrade | LastTrade | Size | AvgSize |
|---|---|---|---|---|
| ABC | 12:01:34 | 12:02:14 | 57 | 19 |
| XYZ | 12:01:54 | 12:02:37 | 32 | 16 |

FIG. 6C

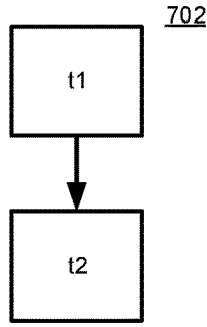
FIG. 7A
FIG. 7B
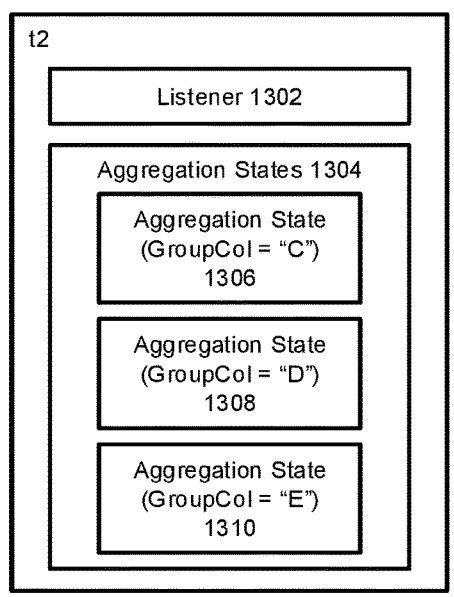
FIG. 8A
FIG. 8B
FIG. 8C

QUERY TASK PROCESSING BASED ON MEMORY ALLOCATION AND PERFORMANCE CRITERIA

This application is related to U.S. patent application Ser. No. 15/154,991, entitled "QUERY TASK PROCESSING BASED ON MEMORY ALLOCATION AND PERFORMANCE CRITERIA" and filed on May 14, 2016, which is incorporated herein by reference in its entirety.

This application claims the benefit of U.S. Provisional Application No. 62/161,813, entitled "Computer Data System" and filed on May 14, 2015, which is incorporated herein by reference in its entirety.

Embodiments relate generally to computer data systems, and more particularly, to methods, systems and computer readable media for memory-efficient and processor-efficient aggregation and data source refreshing.

Data sources or objects within a computer data system may include static sources and dynamic sources. Some data sources or objects (e.g., tables) may depend on other data sources. As new data is received or obtained for dynamic data sources, those dynamic data sources may be refreshed (or updated). Data sources or objects that are dependent on one or more dynamic sources that have been refreshed may also need to be refreshed. The refreshing of data sources may need to be performed in an order based on dependencies.

In addition, some data sources or objects (e.g., tables) contain logical arrays (or collections) of values from other data sources. Data from the other data sources used to create the logical arrays may change. The logical arrays may need to be refreshed as the data used to create the arrays are changed.

Embodiments were conceived in light of the above mentioned needs, problems and/or limitations, among other things.

Some implementations (first implementations) can include a system for maximizing memory and processing efficiencies in a computer system, the system comprising one or more processors and computer readable storage coupled to the one or more processors, the computer readable storage having stored thereon instructions that, when executed by the one or more processors, cause the one or more processors to perform operations. The operations can include sending a digital request from a client computer to a remote query processor on a query server computer. The operations can include creating and storing, in a computer storage, data in a plurality of column sources. The operations can also include creating and storing in a computer memory a first table object index mapping data in the plurality of column sources to a first table object, the computer memory having faster access time than the computer storage. At the remote query processor, memory-efficient and processor-efficient operations can be provided including an aggregation query operation. The aggregation query operation can include receiving an aggregation query task to create a second table object comprising an updateable aggregation of rows from the first table object. The aggregation query operation can include creating and storing in the computer memory separate from the computer storage, the second table object. The aggregation query operation can also include creating a plurality of aggregation states for a plurality of aggregation rows of the second table object, each of the plurality of aggregation rows representing an aggregation of one or more rows of the first table object, each of the plurality of aggregation states being configured to determine an aggregated value for a respective one of the plurality of aggregation rows by executing an aggregation formula. The aggregation query operation can further include storing determined aggregated values in the computer memory separate from the computer storage. The aggregation query operation can include creating and starting a listener for the second table object. The aggregation query operation can also include subscribing to receive at the listener an indication of an update to the first table object. The aggregation query operation can include, responsive to receiving the indication at the listener, selecting one or more of the aggregation states to update the second table object and accessing at most only a subset of rows of the first table object, thereby eliminating the use of repeat processing time for re-executing the aggregation formula and providing faster access to the plurality of aggregation rows of the second table object. The computer storage can be remote from the remote query processor and can be accessed by the remote query processor via a network. The computer memory can be local to the remote query processor.

In some first implementations, aggregated values comprise a collection for each aggregated column of each row of the second table object. In some first implementations, a first collection of a first aggregated column of a first row of the second table object is a first ordered collection, a second collection of a second aggregated column of the first row of the second table object is a second ordered collection, and the first ordered collection and the second ordered collection have a same ordering. In some first implementations, the collection comprises a reference to data of the first table object. In some first implementations, the aggregation function determines a summation and the aggregated values comprise a running sum. In some first implementations, the aggregation function determines a standard deviation and the aggregated values comprise a running sum, a running sum of squares, and a count.

In some first implementations, the aggregation query operation further includes, responsive to the receiving at the listener, detecting a change to an output of an aggregation state of the plurality of aggregation states; and transmitting, responsive to the detecting, a change notification to a subscriber of the second table object. In some first implementations, the change notifications can include one of a data add notification, a data modify notification, a data delete notification and a data reindex notification. In some first implementations, at least one of the plurality of aggregation states is configured to determine an aggregated value based on a new value and an associated previous value of the first table object. In some first implementations, the first ordering and the second ordering is determined based on an ordering of the first table object. In some first implementations, the aggregation query operation further includes determining a mapping of a subset of columns and applying the mapping to one or more other columns to create one or more of the collections for the aggregated columns of the second table object.

Some implementations (second implementations) can include a system for maximizing memory and processing efficiencies in a computer system, the system comprising one or more processors and computer readable storage coupled to the one or more processors, the computer readable storage having stored thereon instructions that, when executed by the one or more processors, cause the one or more processors to perform operations. The operations can include storing a second table object representing an updateable aggregation of rows from a first table object. The operations can include creating a plurality of aggregation states for a plurality of aggregation rows of the second table object, each of the plurality of aggregation rows representing an aggregation of one or more rows of the first table object, each of the plurality of aggregation states being configured to determine an aggregated value for a respective one of the plurality of aggregation rows by executing an aggregation formula. The operations can also include storing determined aggregated values in the computer memory separate from the computer storage. The operations can include receiving an indication of an update to the first table object. The operations can further include, responsive to receiving, selecting one or more of the aggregation states to update the second table object and accessing at most only a subset of rows of the first table object, thereby eliminating the use of repeat processing time for re-executing the aggregation formula and providing faster access to the plurality of aggregation rows of the second table object.

In some second implementations, the aggregated values comprise a collection for each aggregated column of each row of the second table object. In some second implementations, a first collection of a first aggregated column of a first row of the second table object is a first ordered collection, a second collection of a second aggregated column of the first row of the second table object is a second ordered collection, and the first ordered collection and the second ordered collection have a same ordering. In some second implementations, the collection comprises a reference to data of the first table object. In some second implementations, the aggregation function determines a weighted average. In some second implementations, a combination aggregation is determined for a row of the second table object by two or more of the plurality of aggregation states. In some second implementations, data of the first table object is stored in a computer storage that is remote from the computer memory and is accessed via a network, and the computer memory is local to the one or more processors. In some second implementations, the operations can further include determining a mapping of a subset of columns and applying the mapping to one or more other columns to create one or more of the collections for the aggregated columns of the second table object.

In some second implementations, the operations further include detecting a change to an output of an aggregation state of the plurality of aggregation states; and transmitting, responsive to the detecting, a change notification to a subscriber of the second table object. In some second implementations, the change notifications can include one of a data add notification, a data modify notification, a data delete notification and a data reindex notification. In some second implementations, at least one of the plurality of aggregation states is configured to determine an aggregated value based on a new value and an associated previous value of the first table object. In some second implementations, the first ordering and the second ordering is determined based on an ordering of the first table object.

Some implementations (third implementations) can include a nontransitory computer readable medium having stored thereon software instructions that, when executed by one or more processors, cause the one or more processors to perform operations. The operations can include storing, in a computer memory, a second table object representing an updateable aggregation of rows from a first table object. The operations can include creating, at a processor coupled to the computer memory, a plurality of aggregation states for a plurality of aggregation rows of the second table object, each of the plurality of aggregation rows representing an aggregation of one or more rows of the first table object, each of the plurality of aggregation states being configured to determine an aggregated value for a respective one of the plurality of aggregation rows by executing an aggregation formula. The operations can also include storing determined aggregated values in the computer memory. The operations can further include receiving an indication of an update to the first table object. The operations can also include, responsive to receiving, selecting one or more of the aggregation states to update the second table object and accessing a small subset of rows of the first table object, thereby eliminating the use of repeat processing time for re-executing the aggregation formula and providing faster access to the plurality of aggregation rows of the second table object.

In some third implementations, the aggregated values comprise a collection for each aggregated column of each row of the second table object. In some third implementations, a first collection of a first aggregated column of a first row of the second table object is a first ordered collection, a second collection of a second aggregated column of the first row of the second table object is a second ordered collection, and the first ordered collection and the second ordered collection have a same ordering. In some third implementations, the collection comprises a reference to data of the first table object. In some third implementations, the aggregation function determines a maximum value. In some third implementations, data of the first table object is stored in a computer storage that is remote from the computer memory and is accessed via a network, and the computer memory is local to the one or more processors. In some third implementations, the operations further include determining a mapping of a subset of columns and applying the mapping to one or more other columns to create one or more of the collections for the aggregated columns of the second table object.

In some third implementations, the operations further include detecting a change to an output of an aggregation state of the plurality of aggregation states; and transmitting, responsive to the detecting, a change notification to a subscriber of the second table object. In some third implementations, the change notifications can include one of a data add notification, a data modify notification, a data delete notification and a data reindex notification. In some third implementations, at least one of the plurality of aggregation states is configured to determine an aggregated value based on a new value and an associated previous value of the first table object. In some third implementations, the first ordering and the second ordering is determined based on an ordering of the first table object.

Some implementations (fourth implementations) can include a method for maximizing memory and processing efficiencies in a computer system. The method can include storing, in a computer memory, a second table object representing an updateable aggregation of rows from a first table object. The method can also include creating, at a processor coupled to the computer memory, a plurality of aggregation states for a plurality of aggregation rows of the second table object, each of the plurality of aggregation rows representing an aggregation of one or more rows of the first table object, each of the plurality of aggregation states being configured to determine an aggregated value for a respective one of the plurality of aggregation rows. The method can also include storing determined aggregated values in the computer memory. The method can also include receiving an indication of an update to the first table object. The method can also include, responsive to receiving, selecting one or more of the aggregation states to update the second table object and accessing at most only a subset of rows of the first table object, thereby eliminating the use of repeat processing time for re-executing the aggregation formula and providing faster access to the plurality of aggregation rows of the second table object.

In some fourth implementations, the aggregated values comprise a collection for each of one or more aggregated columns of each row of the second table object. In some fourth implementations, a first collection of a first aggregated column of a first row of the second table object is a first ordered collection, a second collection of a second aggregated column of the first row of the second table object is a second ordered collection, and the first ordered collection and the second ordered collection have a same ordering. In some fourth implementations, the collection comprises a reference to data of the first table object. In some fourth implementations, the method further includes detecting a change to an output of an aggregation state of the plurality of aggregation states; and transmitting, responsive to the detecting, a change notification to a subscriber of the second table object. In some fourth implementations, the change notifications can include one of a data add notification, a data modify notification, a data delete notification and a data reindex notification. In some fourth implementations, at least one of the plurality of aggregation states is configured to determine an aggregated value based on a new value and an associated previous value of the first table object. In some fourth implementations, the first ordering and the second ordering is determined based on an ordering of the first table object. In some fourth implementations, the method further includes determining a mapping of a subset of columns and applying the mapping to one or more other columns to create one or more of the collections for the aggregated columns of the second table object. In some fourth implementations, data of the first table object is stored in a computer storage that is remote from the computer memory and is accessed via a network, and the computer memory is local to the one or more processors.

BRIEF DESCRIPTION OF THE DRAWINGS

FIGS. 5A-H illustrate source and result tables of example aggregation operations in accordance with some implementations.

FIGS. 6A-C illustrate an example performing multiple aggregations together in accordance with some implementations.

FIGS. 7A and 7B show data source definitions and a corresponding directed acyclic graph (DAG) in accordance with some implementations.

FIG. 8A shows a data source table (t1 defined in FIG. 7A) in accordance with some implementations.

FIGS. 8B and 8C illustrate an aggregation table that is a result of the aggregation operation shown in FIGS. 7A-7B in accordance with some implementations.

DETAILED DESCRIPTION

Reference may be made herein to the Java programming language, Java classes, Java bytecode and the Java Virtual Machine (JVM) for purposes of illustrating example implementations. It will be appreciated that implementations can include other programming languages (e.g., groovy, Scala, R, Go, etc.), other programming language structures as an alternative to or in addition to Java classes (e.g., other language classes, objects, data structures, program units, code portions, script portions, etc.), other types of bytecode, object code and/or executable code, and/or other virtual machines or hardware implemented machines configured to execute a data system query.

Figure 1:
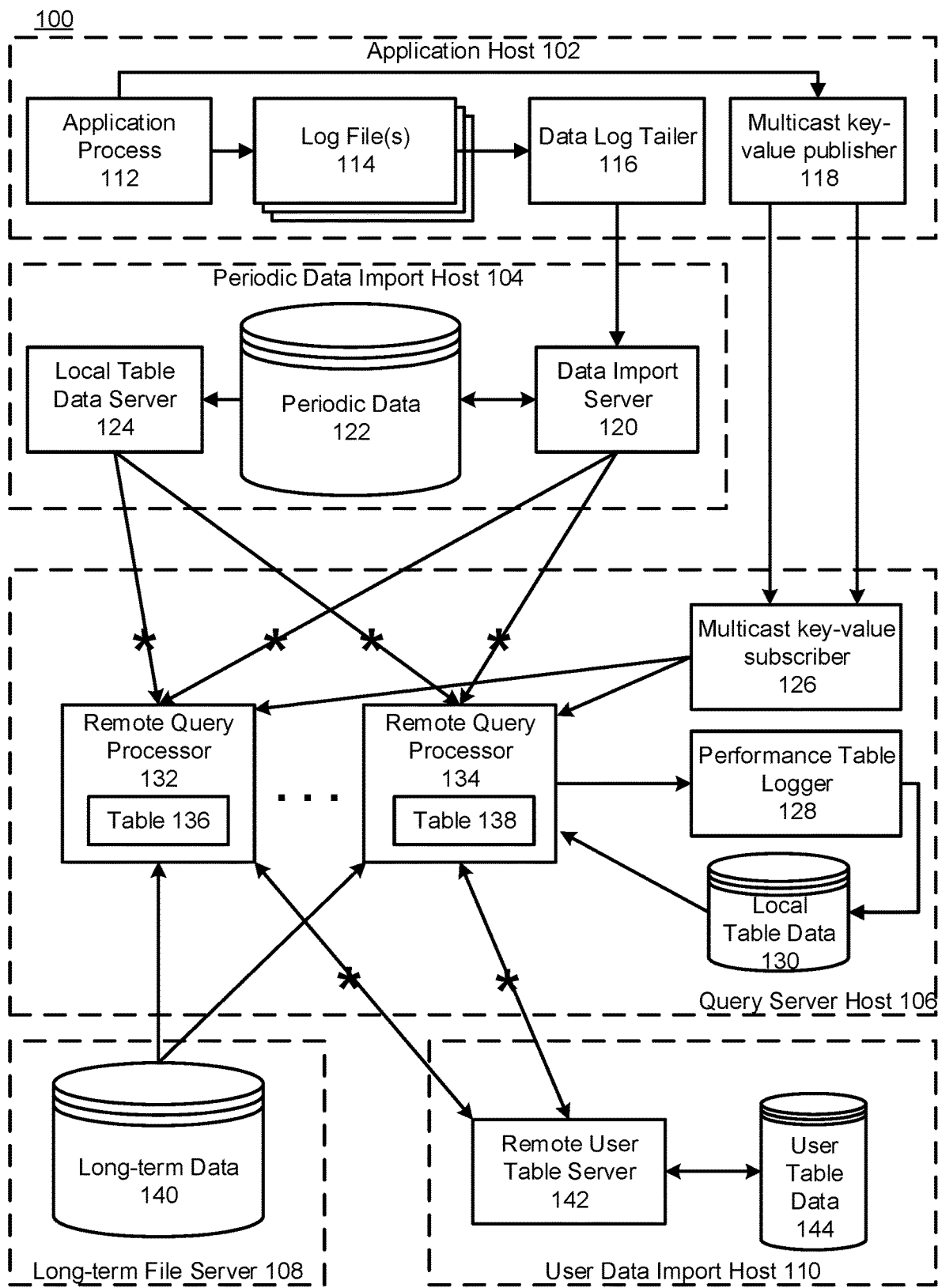
FIG. 1 is a diagram of an example computer data system showing an example data distribution configuration in accordance with some implementations.
Figure 2:
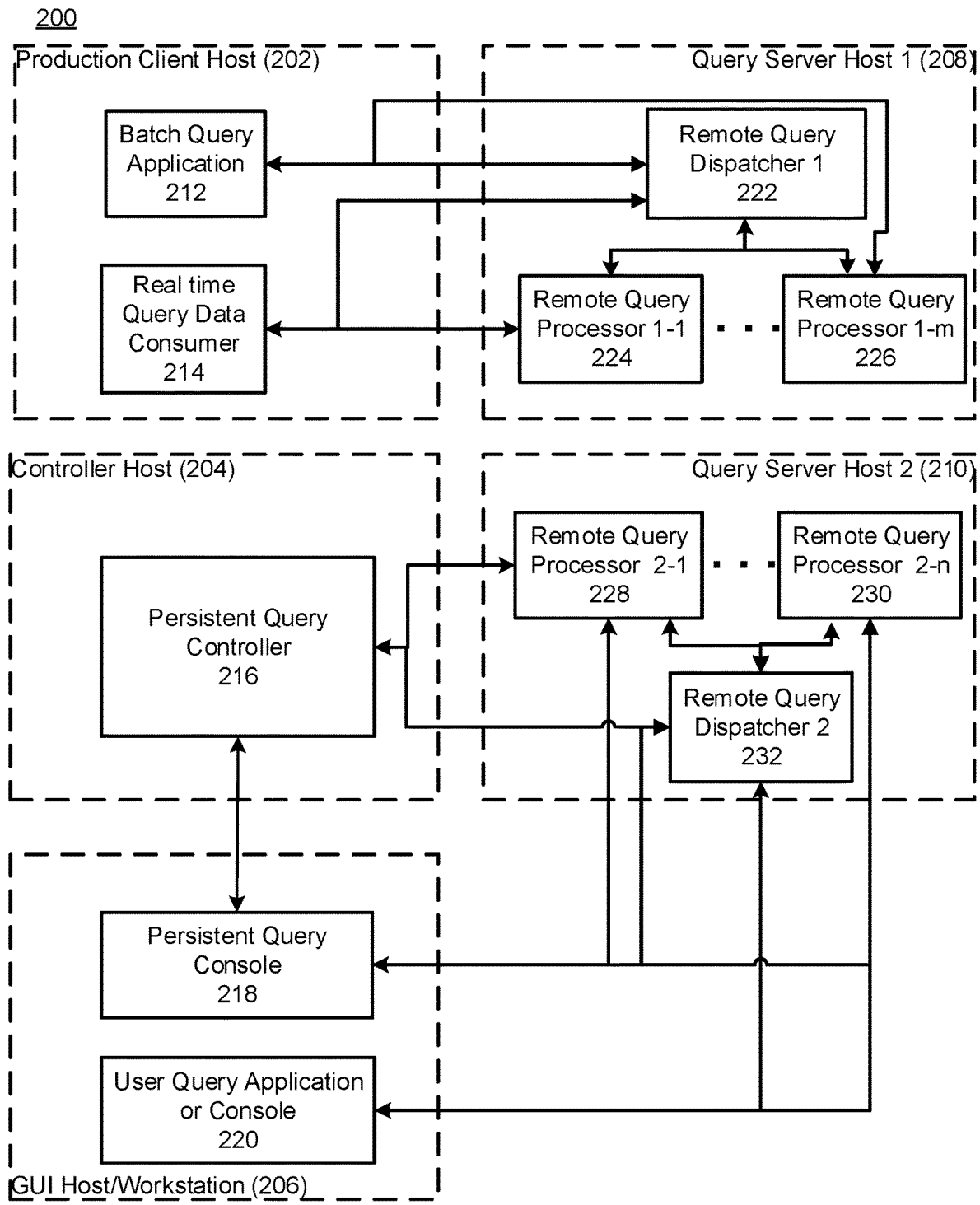
FIG. 2 is a diagram of an example computer data system showing an example administration/process control arrangement in accordance with some implementations.

FIG. 1 is a diagram of an example computer data system and network 100 showing an example data distribution configuration in accordance with some implementations. In particular, the system 100 includes an application host 102, a periodic data import host 104, a query server host 106, a long-term file server 108, and a user data import host 110. While tables are used as an example data object in the description below, it will be appreciated that the data system described herein can also process other data objects such as mathematical objects (e.g., a singular value decomposition of values in a given range of one or more rows and columns of a table), TableMap objects, etc. A TableMap object provides the ability to lookup a Table by some key. This key represents a unique value (or unique tuple of values) from the columns aggregated on in a byExternal( ) statement execution, for example. A TableMap object can be the result of a byExternal( ) statement executed as part of a query. It will also be appreciated that the configurations shown in FIGS. 1 and 2 are for illustration purposes and in a given implementation each data pool (or data store) may be directly attached or may be managed by a file server.

The application host 102 can include one or more application processes 112, one or more log files 114 (e.g., sequential, row-oriented log files), one or more data log tailers 116 and a multicast key-value publisher 118. The periodic data import host 104 can include a local table data server, direct or remote connection to a periodic table data store 122 (e.g., a column-oriented table data store) and a data import server 120. The query server host 106 can include a multicast key-value subscriber 126, a performance table logger 128, local table data store 130 and one or more remote query processors (132, 134) each accessing one or more respective tables (136, 138). The long-term file server 108 can include a long-term data store 140. The user data import host 110 can include a remote user table server 142 and a user table data store 144. Row-oriented log files and column-oriented table data stores are discussed herein for illustration purposes and are not intended to be limiting. It will be appreciated that log files and/or data stores may be configured in other ways. In general, any data stores discussed herein could be configured in a manner suitable for a contemplated implementation.

In operation, the input data application process 112 can be configured to receive input data from a source (e.g., a securities trading data source), apply schema-specified, generated code to format the logged data as it's being prepared for output to the log file 114 and store the received data in the sequential, row-oriented log file 114 via an optional data logging process. In some implementations, the data logging process can include a daemon, or background process task, that is configured to log raw input data received from the application process 112 to the sequential, row-oriented log files on disk and/or a shared memory queue (e.g., for sending data to the multicast publisher 118). Logging raw input data to log files can additionally serve to provide a backup copy of data that can be used in the event that downstream processing of the input data is halted or interrupted or otherwise becomes unreliable.

A data log tailer 116 can be configured to access the sequential, row-oriented log file(s) 114 to retrieve input data logged by the data logging process. In some implementations, the data log tailer 116 can be configured to perform strict byte reading and transmission (e.g., to the data import server 120). The data import server 120 can be configured to store the input data into one or more corresponding data stores such as the periodic table data store 122 in a column-oriented configuration. The periodic table data store 122 can be used to store data that is being received within a time period (e.g., a minute, an hour, a day, etc.) and which may be later processed and stored in a data store of the long-term file server 108. For example, the periodic table data store 122 can include a plurality of data servers configured to store periodic securities trading data according to one or more characteristics of the data (e.g., a data value such as security symbol, the data source such as a given trading exchange, etc.).

The data import server 120 can be configured to receive and store data into the periodic table data store 122 in such a way as to provide a consistent data presentation to other parts of the system. Providing/ensuring consistent data in this context can include, for example, recording logged data to a disk or memory, ensuring rows presented externally are available for consistent reading (e.g., to help ensure that if the system has part of a record, the system has all of the record without any errors), and preserving the order of records from a given data source. If data is presented to clients, such as a remote query processor (132, 134), then the data may be persisted in some fashion (e.g., written to disk).

The local table data server 124 can be configured to retrieve data stored in the periodic table data store 122 and provide the retrieved data to one or more remote query processors (132, 134) via an optional proxy.

The remote user table server (RUTS) 142 can include a centralized consistent data writer, as well as a data server that provides processors with consistent access to the data that it is responsible for managing. For example, users can provide input to the system by writing table data that is then consumed by query processors.

The remote query processors (132, 134) can use data from the data import server 120, local table data server 124 and/or from the long-term file server 108 to perform queries. The remote query processors (132, 134) can also receive data from the multicast key-value subscriber 126, which receives data from the multicast key-value publisher 118 in the application host 102. The performance table logger 128 can log performance information about each remote query processor and its respective queries into a local table data store 130. Further, the remote query processors can also read data from the RUTS, from local table data written by the performance logger, or from user table data read over NFS, for example.

It will be appreciated that the configuration shown in FIG. 1 is a typical example configuration that may be somewhat idealized for illustration purposes. An actual configuration may include one or more of each server and/or host type. The hosts/servers shown in FIG. 1 (e.g., 102-110, 120, 124 and 142) may each be separate or two or more servers may be combined into one or more combined server systems. Data stores can include local/remote, shared/isolated and/or redundant. Any table data may flow through optional proxies indicated by an asterisk on certain connections to the remote query processors. Also, it will be appreciated that the term "periodic" is being used for illustration purposes and can include, but is not limited to, data that has been received within a given time period (e.g., millisecond, second, minute, hour, day, week, month, year, etc.) and which has not yet been stored to a long-term data store (e.g., 140).

FIG. 2 is a diagram of an example computer data system 200 showing an example administration/process control arrangement in accordance with some implementations. The system 200 includes a production client host 202, a controller host 204, a GUI host or workstation 206, and query server hosts 208 and 210. It will be appreciated that there may be one or more of each of 202-210 in a given implementation.

The production client host 202 can include a batch query application 212 (e.g., a query that is executed from a command line interface or the like) and a real time query data consumer process 214 (e.g., an application that connects to and listens to tables created from the execution of a separate query). The batch query application 212 and the real time query data consumer 214 can connect to a remote query dispatcher 222 and one or more remote query processors (224, 226) within the query server host 1 208.

The controller host 204 can include a persistent query controller 216 configured to connect to a remote query dispatcher 232 and one or more remote query processors 228-230. In some implementations, the persistent query controller 216 can serve as the "primary client" for persistent queries and can request remote query processors from dispatchers, and send instructions to start persistent queries. For example, a user can submit a query to 216, and 216 starts and runs the query every day. In another example, a securities trading strategy could be a persistent query. The persistent query controller can start the trading strategy query every morning before the market opened, for instance. It will be appreciated that 216 can work on times other than days. In some implementations, the controller may require its own clients to request that queries be started, stopped, etc. This can be done manually, or by scheduled (e.g., cron) jobs. Some implementations can include "advanced scheduling" (e.g., auto-start/stop/restart, time-based repeat, etc.) within the controller.

The GUI/host workstation can include a user console 218 and a user query application 220. The user console 218 can be configured to connect to the persistent query controller 216. The user query application 220 can be configured to connect to one or more remote query dispatchers (e.g., 232) and one or more remote query processors (228, 230).

Figure 3:
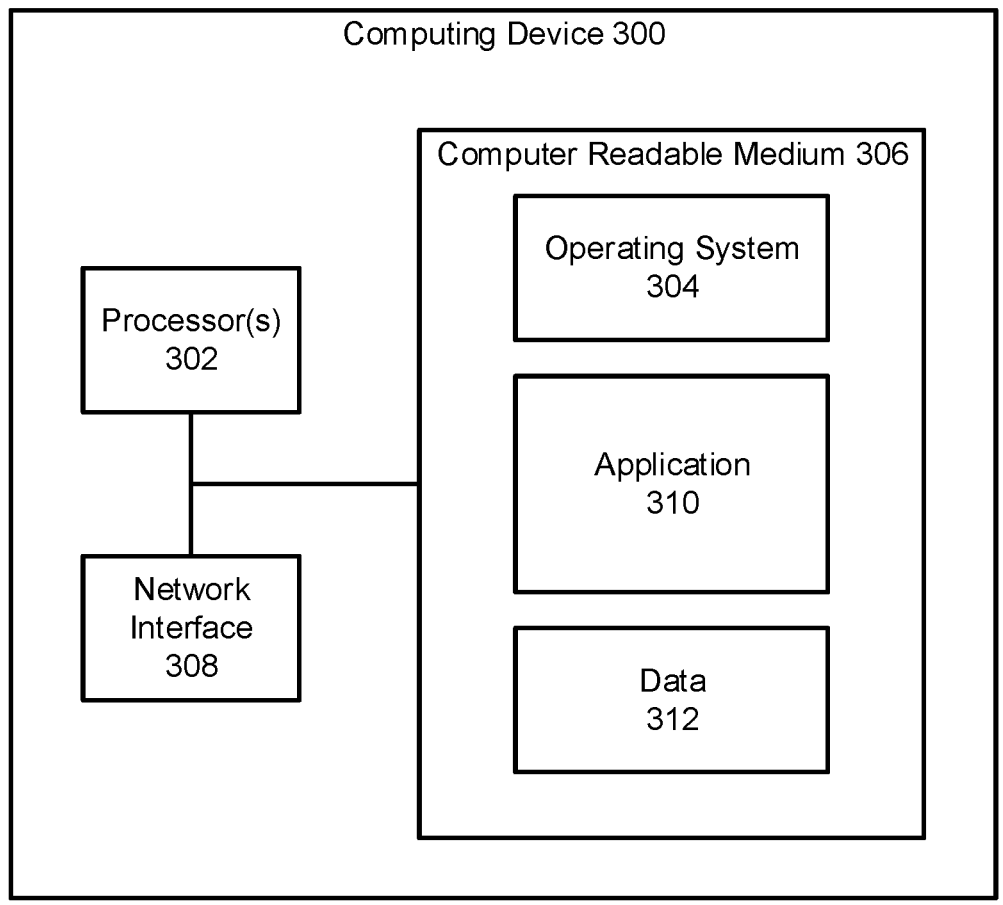
FIG. 3 is a diagram of an example computing device configured for memory-efficient and processor-efficient aggregation and data source refresh processing in accordance with some implementations.

FIG. 3 is a diagram of an example computing device 300 in accordance with at least one implementation. The computing device 300 includes one or more processors 302, operating system 304, computer readable medium 306 and network interface 308. The memory 306 can include a data source refresh application 310 and a data section 312 (e.g., for storing DAGs, etc.).

In operation, the processor 302 may execute the application 310 stored in the memory 306. The application 310 can include software instructions that, when executed by the processor, cause the processor to perform operations for memory-efficient and processor-efficient aggregation and data source refreshing in accordance with the present disclosure (e.g., performing one or more of 402-410 and 1202-1226 described below).

The application program 310 can operate in conjunction with the data section 312 and the operating system 304.

Figure 4:
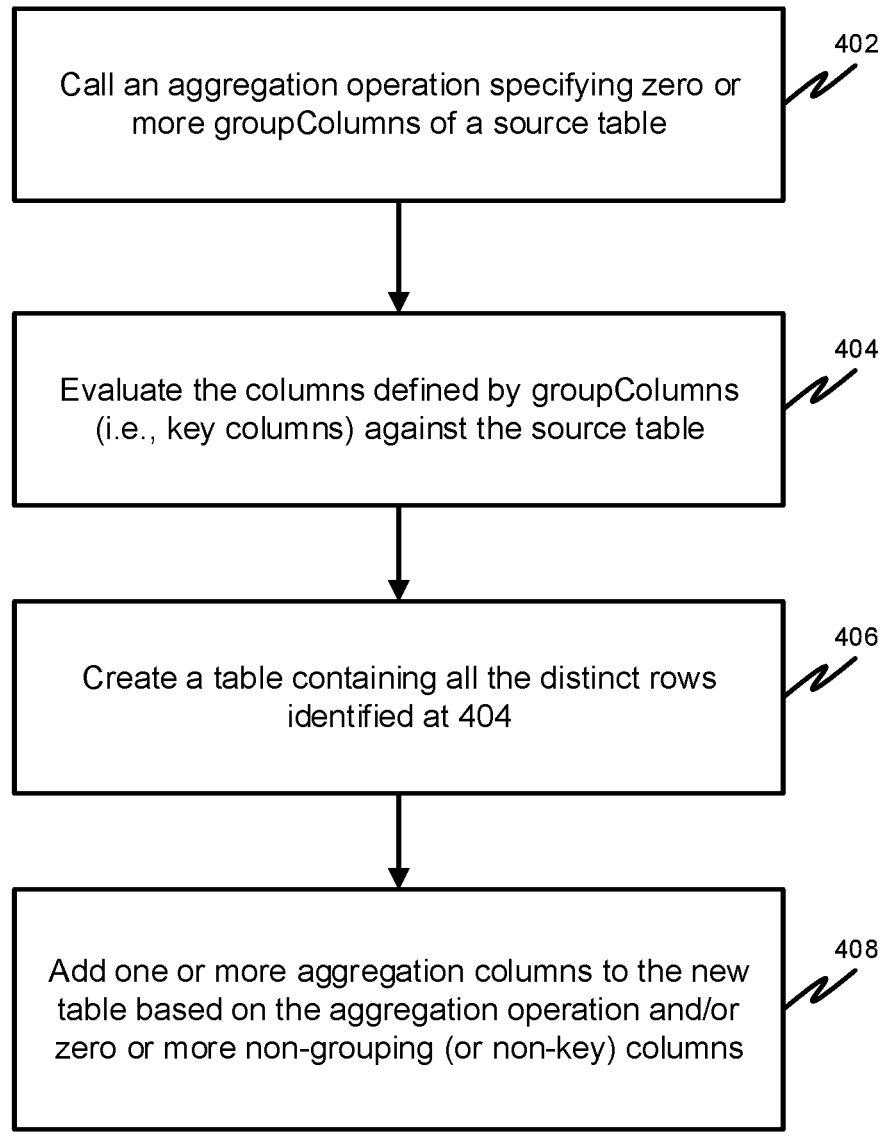
FIG. 4 is a flowchart of an aggregation operation in accordance with some implementations.

FIG. 4 is a flowchart of an aggregation operation in accordance with some implementations. Processing begins at 402.

At 402, an aggregation operation is called on a source table. The aggregation operation can specify zero or more "groupColumns" of the source table. The aggregation operation can, for example, be a general "by( )" operation, a dedicated aggregator, a combined aggregation, a "byExternal( )" operation, a user-defined aggregator, or the like. In some implementations, the syntax for calling a "by( )" aggregation operation is "Table by(String . . . groupColumns)". Processing continues to 404.

At 404, the columns defined by groupColumns (i.e., key columns or grouping columns) are evaluated against the source table. Each of the groupColumns is read, and a combined key is created. All rows from the source table are mapped to an aggregation state. Each row that has the same values for the groupColumns are mapped to the same state. Rows that have different values for the groupColumns are mapped to different states. In the case where no groupColumns are specified, all rows map to a single aggregation state. Processing continues to 406.

At 406, a new table is created containing all the distinct rows identified at 404. Processing continues to 408.

At 408, one or more aggregation columns (or result columns) is added to the new table based on the aggregation operation and/or the zero or more non-grouping (or non-key) columns. For example, a new column can be added for each non-grouping (or non-key) column with the same name and containing a collection (e.g., an array) with one element for each row that maps to the given distinct grouping key (set of grouping column values) as shown, for example, in FIGS. 5B and 5C. As can be seen in the result shown in FIG. 5C, the result columns A and B produce collections of elements from the original table. Such collections can maintain the ordering (e.g., row ordering) from the original or source table. In some examples there is not an exact match in the cardinality. For example, not all of the columns will be brought over for some operations (e.g., the "Count" operation only produces one additional result column). In other examples, several result columns can be created from one input column (e.g., the combination aggregation). For example, the Sum, Min, and Max from one input column can be applied in the same aggregation operation (e.g., an combination aggregation such as, for example, that shown in FIGS. 6A-6B in which the Min and Max are applied to the same "Timestamp" input column and the Sum and Average are applied to the same "Size" input column). In another example, two or more non-key columns of the source table can be used to create fewer result columns (e.g., a value column and a weight column of a source table can be used by a Weighted Average operation producing a single result column).

In some implementations, the array columns added at 408 (corresponding to columns not addressed explicitly in the grouping columns) are not actually instantiated in memory. In some such implementations, aggregation operations (e.g., the by( ) operation) only computes a mapping of their value in the original table, and this mapping is shared among all non-grouping (or non-key) columns, thereby reducing memory usage for aggregation operations. In some implementations, the appropriate result mapping can be determined from a subset of columns (e.g., only the key columns), and then applied to multiple result columns, thereby improving memory utilization and processor consumption. Consequently, it is relatively cheap to do something like Table1.by("GroupCol"), even for a very large table "Table1". In some implementations, the cost of a by(groupColumns) operation is comparable to select(groupColumns) in terms of execution time, and the storage overhead is driven by the storage requirements of the groupColumns.

In some implementations, dedicated aggregators (or predefined aggregation functions) can apply a given standard operation to all non-key columns such as, for example, those listed in Table 1 below.

TABLE 1

Predefined Aggregation Functions

| Predefined Aggregation Function Syntax | Description |
| --- | --- |
| Table sumBy(String . . . groupByColumns) | Group by key columns, then calculate the sum of all other columns |
| Table avgBy(String . . . groupByColumns) | Group by key columns, then calculate the average of all other columns |
| Table stdBy(String . . . groupByColumns) | Group by key columns, then calculate the standard deviation of all other columns |
| Table varBy(String . . . groupByColumns) | Group by key columns, then calculate the variance of all other columns |

TABLE 1-continued

Predefined Aggregation Functions

| Predefined Aggregation Function Syntax | Description |
| --- | --- |
| Table medianBy(String . . . groupByColumns) | Group by key columns, then calculate the median of all other columns |
| Table lastBy(String . . . groupByColumns) | Group by key columns, then return the last one. This generates a table with the last row with each distinct "groupbyColumns" value. |
| Table firstBy(String . . . groupByColumns) | Group by key columns, then return the first one. This generates a table with the first row with each distinct "groupbyColumns" value. |
| Table minBy(String . . . groupByColumns) | Group by key columns, then calculate the minimum of all other columns |
| Table maxBy(String . . . groupByColumns) | Group by key columns, then calculate the maximum of all other columns |
| Table countBy(String countColumn, String . . . groupByColumns) | Group by key columns, then count number of rows in each group. |
| Table countBy(String countColumn) | Give the total number of values in the column, equivalent to by( ).count(countColumn). |

Examples of predefined aggregation functions are shown in FIGS. 5E-H. FIG. 5E shows a result of a lastBy( ) operation in accordance with some implementations. FIG. 5F shows a result of avgBy( ) operation in accordance with some implementations. FIG. 5G shows a result of sumBy( ) operation in accordance with some implementations. FIGS. 5F and 5G show the result of avgBy( ) and sumBy( ) operations, respectively, applied to results of applying the view( ) operation on the source table shown in FIG. 5A.

In some implementations, a combined aggregation can be used to perform multiple aggregations together. In some such implementations, the following syntax is used: "resultTable=sourceTable.by(AggCombo(ComboBy . . . Aggregators), String . . . groupByColumns);", where each aggregation is defined by a "ComboBy" object that can, for example, be created using methods of a "ComboAggregateFactory" class. The ComboAggregateFactory class can, for example, provide the following methods: ComboBy AggMin(String . . . matchPairs); ComboBy AggMax(String . . . matchPairs); ComboBy AggSum(String . . . matchPairs); ComboBy AggVar(String . . . matchPairs); ComboBy AggAvg(String . . . matchPairs); ComboBy AggStd(String . . . matchPairs); ComboBy AggFirst(String . . . matchPairs); ComboBy AggLast(String . . . matchPairs); ComboBy AggArray (String . . . matchPairs); and ComboBy AggCount(String resultColumn).

The source column names for the calculations and the names for their respective results in the new table can be provided as arguments to the ComboAggregateFactory methods. For example, if calculating both the earliest timestamp and the lowest price, the appropriate ComboBy would be created by calling: AggMin("Timestamp", "Price"). The resulting column can be given a different name than the source column: AggMin("EarliestTimestamp=Timestamp", "LowestPrice=Price").

This syntax can apply to all of the methods except AggCount( ). Because AggCount( ) determines the count based on the number of rows rather than any particular source column, the only argument to AggCount( ) is the desired result column name: AggCount("Count") or AggCount("Total").

Passing multiple ComboBy objects can provide a concise and expressive syntax for aggregation. An example illustrating the use of multiple ComboBy objects is shown in FIGS. 6A-C and described below. In this example, table1 shown in FIG. 6A contains records of option trades in companies ABC and XYZ. Table1 can be used to determine the first and last trade times, the total size traded, and the average trade size, which can be performed by calculating minima, maxima, sums, and averages—four different types of aggregations. It would be inefficient to perform minBy( ), maxBy( ), sumBy( ), and avgBy( ) in four separate steps, creating four separate tables, then to join the results. Instead, the desired result can be produced more efficiently, and with simpler, more compact code, using the example combined aggregation syntax shown in FIG. 6B. The result of processing the combined aggregation code shown in FIG. 6B is shown in FIG. 6C.

In some implementations, a "byExternal( )" operation can divide a single table into multiple tables, which can be accessed through a "TableMap". For example, a large table containing values for many USyms can be divided into a TableMap using: curveLog=db.getLastByTable("SystemEQ", "CurveLog").where("Date=currentDateNy( )"); and curveLogByUsym=curveLog.byExternal("USym"). To retrieve an individual table from the map: spy=curveLogByUsym.get("SPY"). The set of keys can be obtained using the TableMap getKeySet( ) method.

In some implementations, a byExternal("USym") operation is performed to divide a table for a one-click action from a console. In another example, some use cases may include dividing a table into smaller pieces, each requiring a distinct where clause (e.g., tableA=table.where("Value='A'"); and tableB=table.where("Value='B'")). Using byExternal ("Value") eliminates the need to have one pass over the data for each of the values of interest.

In some implementations, user-defined aggregators can include an "applyToAllBy( )" operation having the following syntax: Table applyToAllBy(String formulaColumn, String . . . groupByColumns). The groupByColumns groups data by key columns and applies formulaColumn to each of the non-key columns. The formulaColumn represents the formula applied to each column, and uses the parameter, for example, "each" to refer to each column to which it is being applied, as shown, for example, in FIG. 5H.

Although not explicitly shown in FIG. 4, it will be appreciated that, in some implementations, the result of an aggregation operation (e.g., the tables shown in FIGS. 5B-5H, 6C, and 8B) can be automatically updated as its source table (e.g., FIGS. 5A, 6A, and 8A) (and/or any sources of the source table) is updated as shown in FIGS. 7A, 7B, 8A-8C, 9A-9E, and 12, and described herein.

FIGS. 7A and 7B show data source definitions and a corresponding directed acyclic graph query (DAG) in accordance with some implementations. In FIG. 7A, example code 700 defines the data sources as tables (t1 and t2). From the code 700 for the data sources, DAG 702 can be generated as shown by the graph in FIG. 7B. DAG 702 in FIG. 7B shows dependencies between the nodes, which correspond to table data sources.

Figures 14A, 14B:
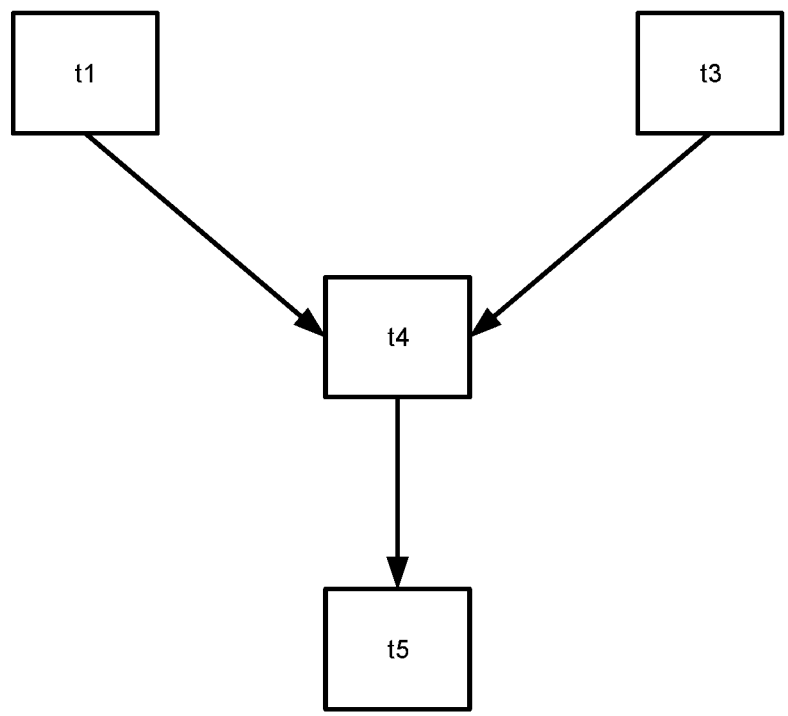
FIGS. 14A and 14B also show data source definitions and a corresponding directed acyclic graph (DAG) in accordance with some implementations.

Although the DAG in FIG. 7B includes only two nodes, DAGs can be generated with more nodes in various configurations. For example, FIGS. 14A and 14B also show data source definitions and a corresponding directed acyclic graph (DAG) in accordance with some implementations. In FIG. 14A, example code defines the data sources as tables (t1, t3, t4, and t5), where t1 and t3 are primary data sources. From the code for the data sources, a DAG can be generated as shown by the graph in FIG. 14B. The DAG in FIG. 14B shows dependencies between the nodes, which correspond to table relationships defined in FIG. 14A.

Data sources can include market data (e.g., data received via multicast distribution mechanism or through a tailer), system generated data, historical data, user input data from the remote user table server, tables programmatically generated in-memory, or something further downstream in the DAG. In general, anything represented in the data system as a table and which can refresh itself/provide data can be a data source. Also, data sources can include non-table data structures which update, for example, mathematical data structures. As shown in FIG. 7A, t2=t1.sumBy("GroupCol"), where this creates a summation aggregation of table t1 as a new table t2. The table t2 would then get updated when t1 changes as shown, for example, in FIGS. 9A-9E and 12. Similarly, minimum, maximum, variance, average, standard deviation, first, last, by, etc. aggregations can be supported, as shown, for example, in FIG. 14B, t5=t4.stdBy("GroupCol"), where this creates a standard deviation aggregation of table t4 as a new table t5.

In some implementations, code can be converted into the in-memory data structures holding the DAG. For example, the source code of FIG. 7A gets converted into the DAG data structure in memory. The DAG connectivity can change by executing code. For example, assume a set of code CODE1 is executed. CODE1 leads to a DAG1 being created. Data can be processed through DAG1, leading to table updates. Now assume that the user wants to compute a few more tables. The user can run a few more lines of code CODE2, which use variables computed in CODE1. The execution of CODE2 leads to a change in the DAG. As a simple example, assume that the first 3 lines in FIG. 14A are executed. The user could come along later and execute line 4, which would modify the DAG data structure (i.e., adding t5). Also, some implementations can permit other programs to listen to changes from a node representing a data object (e.g., table or non-table object).

In some implementations, when a table changes, an application programming interface (API) can specify, for example, rows where add, modify, delete, or reindex (AMDR) changes were made. A reindex is a change in which a row is moved but the value contained in the row is not modified. The API can also provide a mechanism to obtain a value prior to the most recent change. When the DAG is processed during the refresh, the AMDR info on "upstream" data objects (e.g., tables, etc.) or nodes can be used to compute changes in "downstream" data objects or nodes. In some implementations, the entire DAG can be processed during the refresh cycle.

In general, a DAG can be comprised of a) dynamic nodes (DN); b) static nodes (SN); and c) internal nodes (IN) that can include nodes with DN and/or SN and/or IN as inputs.

DNs are nodes of the graph that can change. For example, DN can be data sources that update as new data comes in. DN could also be timers that trigger an event based on time intervals. In other examples, DN could also be MySQL monitors, specialized filtering criteria (e.g., update a "where" filter only when a certain event happens). Because these nodes are "sources", they may occur as root nodes in the DAG. At the most fundamental level, DN are root DAG nodes which change (e.g., are "alive").

SNs are nodes of the DAG that do not change. For example, historical data does not change. IN are interior nodes of the DAG. The state of an IN can be defined by its inputs, which can be DN, SN, and or IN. If all of the IN inputs are "static", the IN will be static. If one or more of the IN inputs is "dynamic", the IN will be dynamic. IN can be tables or other data structures. For example, a "listener IN" can permit code to listen to a node of the DAG. A listener node or associated listener monitoring code can place (or "fire") additional events (or notifications) into a priority queue of a DAG.

In general, a DAG can be composed of static and/or dynamic subgraphs. In some implementations, update processing occurs on dynamic subgraphs (because static subgraphs are not changing). In some such implementations, only dynamic nodes are in the DataMonitor loop. For Tables, change notification messages such as, for example, AMDR messages can be used for communication within the DAG.

When query code is executed, the DAG is created or modified. As part of this process, the system records the order in which the DAG nodes were constructed in. This "construction ordering" can be used to determine the order that nodes are processed in the DAG.

For example, consider:
a=db.i( . . . ), where a is a dynamic node (or DN)
b=a.where("A=1")
c=b.where("A=2")
d=c.join(b)

Assume (a) has changes to be processed during a refresh cycle. The order of processing will be (a), (b), (c), and then (d).

When (d) is processed, it will process input changes from both (b) and (c) before creating AMDRs notification messages for (d). This ordering prevents (d) from creating more than one set of AMDRs per input change, and it can help ensure that all AMDRs are consistent with all data being processed for the clock cycle. If this ordering were not in place, it may be possible to get multiple ticks per cycle and some of the data can be inconsistent. Also, the ordering can help ensure that joins produce consistent results.

In some examples, a single data source is used more than once (i.e., has two or more child nodes in the DAG).

It will be appreciated that the implementations discussed above can use any update message format and are not limited to AMDR messages.

In some implementations, refresh processing of a DAG such as those shown in FIGS. 7B and 14B can be performed as disclosed in U.S. patent application Ser. No. 15/154,975, entitled "COMPUTER DATA SYSTEM DATA SOURCE REFRESHING USING AN UPDATE PROPAGATION GRAPH" (Attorney Docket No. W1.4-10058) and filed on May 14, 2016 (hereinafter the '975 application), which is hereby incorporated by reference herein in its entirety as if fully set forth herein. For example, refresh processing of the DAG can be performed in accordance with the data source refresh processes disclosed by FIG. 6 and the specification of the '975 application, where the notifications delivered at 614 include the AMDR notifications shown in FIGS. 9A-9E of the present disclosure and described below.

FIG. 8A shows a data source table (t1 defined in FIG. 7A) in accordance with some implementations. Table t1 includes three columns (GroupCol 402, DataCol1 404, and DataCol2 408) and six rows including Row1 410 and Row5 412.

FIGS. 8B and 8C illustrate aggregation table t2 that is a result of the aggregation operation shown in FIGS. 7A-7B in accordance with some implementations. Table t2 is the result of the aggregation operation sumBy("GroupCol") shown in FIG. 7A. Table t2 includes three columns (GroupCol 602, DataCol1 604, DataCol2 606) corresponding to the columns of t1 (402, 404, and 406, respectively) and aggregates rows based on the column specified in the sumBy( ) call—the "GroupCol" column. Accordingly, table t2 includes a row for each of the distinct values of the GroupCol 402 column of t1: Row0 610 for those rows of t1 with "C" in the GroupCol 402 column, Row1 612 for those rows of t1 with "D" in the GroupCol 402 column, and Row2 608 for those rows of t1 with "E" in the GroupCol 402 column.

In some implementations, an aggregation state is created for each row of the result of an aggregation operation as shown, for example, in FIG. 8C. FIG. 8C shows aggregation table t2 including a listener 1302 and aggregation states 1304 in accordance with some implementations. Aggregation states 1304 includes aggregation states 1306, 1308, and 1310 for Row0 610, Row1 612, and Row2 608 of t2, respectively. Table t2 can subscribe to updates from its parent or upstream source table t1 and receive at listener 1302 AMDR messages (e.g., via the DAG) indicating updates to t1. The AMDR messages can be processed according to the method shown, for example, in FIG. 12. In some implementations listener 1302 receives AMDR messages, identifies the appropriate aggregation state(s) to handle the messages (e.g., including creating/removing aggregation states when appropriate), and calls the identified aggregation state(s) to process the updates indicated in the AMDR messages, as shown, for example, in FIGS. 9A-9E.

Figure 9A:
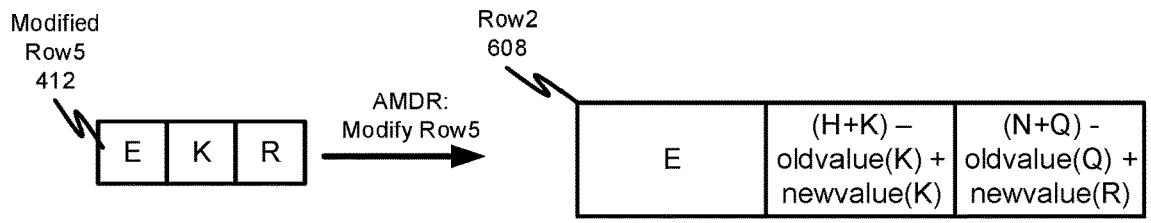
FIG. 9A illustrates automatic updating of an aggregation result when a row is modified in a source table in accordance with some implementations.

FIG. 9A illustrates automatic updating of an aggregation result when a row is modified in a source table in accordance with some implementations. When row 412 of t1 is modified, t2 is notified via an AMDR message. The AMDR message can be generated based on the DAG created when t2 was defined as shown, for example, in FIGS. 7A and 7B and discussed above. The DAG node for t2 can receive the AMDR message and the update for the corresponding aggregation row 608 can be determined by accessing at most only a subset of rows of the source table that had previously been aggregated for aggregation row 608 (e.g., determined without having to access the other rows of t1 that had previously been aggregated for aggregation row 608) according to, for example, the method shown in FIG. 12. The term subset is meant to mean less than all of the entire set.

In some implementations, processing the update can include determining that the key (i.e., value of the grouping column 402) of row 412 (i.e., "E") has not changed (by comparing its oldvalue and newvalue for the current update/refresh/clock cycle) and then identifying the aggregation state(s) associated with that key (e.g., aggregation state 1310 shown in FIG. 8C). In some implementations, different aggregation functions can be applied to different columns and different aggregation states can be created for the different aggregation functions. In some implementations, the same aggregation function can be applied to multiple columns and one aggregation state or multiple aggregation states can be created for the multiple columns. The associated aggregation state(s) can process the row modification by accessing a small subset of rows of the source table aggregated by the aggregation state (e.g., without accessing the values of the other rows of t1 that had previously been aggregated by the aggregation state). For example, an aggregation state for the summation aggregation shown can store a running sum for each column being aggregated. Such an aggregation state can process the row modification by, for each column being aggregated, subtracting the oldvalue of the modified row's corresponding column from, and adding the newvalue of the modified row's corresponding column to, the running sum (i.e., the value before processing the modification to row 412 of t1).

For column 606 of aggregation row 608, the current aggregation value is the result of the sum of (N+Q), and the summation aggregation state associated with that column/row can determine an updated aggregation value by subtracting the corresponding oldvalue(Q) from (N+Q) and adding the corresponding newvalue(R). It can be determined (e.g., by the aggregation state) that the aggregation value has changed and an AMDR notification indicating the change can be generated for any child nodes (or subscribers) of t2.

For column 604 of aggregation row 608, the current aggregation value is the result of (H+K), and the summation aggregation state can determine the updated aggregation value by subtracting the corresponding oldvalue(K) and adding the corresponding newvalue(K).

Figure 9B:
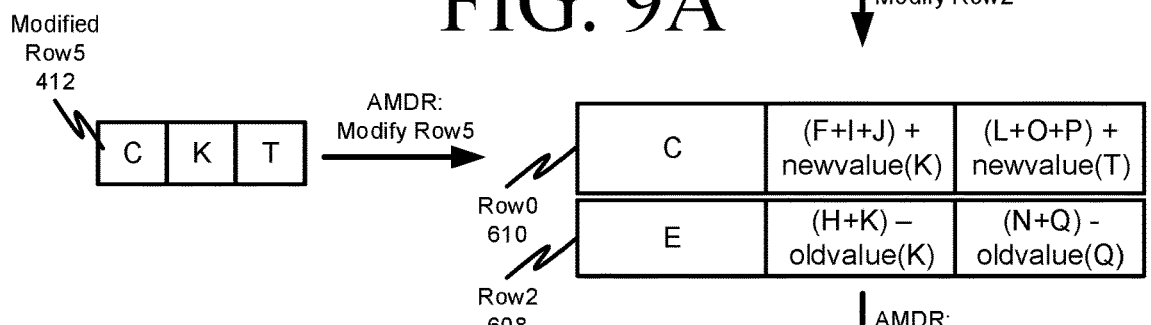
FIG. 9B illustrates automatic updating of an aggregation result when a row is modified in a source table and the modification includes a change to the key in accordance with some implementations.

FIG. 9B illustrates automatic updating of an aggregation result when a row is modified in a source table and the modification includes a change to the key in accordance with some implementations. When row 412 of t1 is modified as shown in FIG. 9B, t2 is notified via an AMDR message.

In some implementations, processing the update can include determining that the key (i.e., value of the grouping column 402) of row 412 has changed from "E" to "C" (by comparing its oldvalue and newvalue for the current update/refresh/clock cycle) and identifying the aggregation state(s) associated with those key (e.g., aggregation states 1306 and 1310 shown in FIG. 8C). The associated aggregation state(s) can process the row modification by accessing a small subset of rows of the source table aggregated by the aggregation state (e.g., without accessing the values of other rows of t1 that had previously been aggregated by the aggregation state). The aggregation state associated with the key's oldvalue can process the update by, for each aggregated column, removing the oldvalue of the column in row 412 from the aggregation value. The aggregation state associated with the key's newvalue can process the update by, for each aggregated column, adding the newvalue of the column in row 412 to the aggregation value.

For column 604 of aggregation row 610, the current aggregation value is the result of the sum of (F+I+J), and the summation aggregation state associated with that column/row can determine an updated aggregation value by adding the corresponding newvalue(K) to (F+I+J). For column 606 of aggregation row 610, the current aggregation value is the result of (L+O+P), and the summation aggregation state can determine the updated aggregation value by adding the corresponding newvalue(T). It can be determined (e.g., by the aggregation state) that the aggregation value(s) of aggregation row 610 has changed and an AMDR notification indicating the change can be generated for any child nodes (or subscribers) of t2.

For column 604 of aggregation row 608, the current aggregation value is the result of the sum of (H+K), and the summation aggregation state associated with that column/row can determine an updated aggregation value by subtracting the corresponding oldvalue(K) from (H+K). For column 606 of aggregation row 608, the current aggregation value is the result of (N+Q), and the summation aggregation state can determine the updated aggregation value by subtracting the corresponding oldvalue(Q). It can be determined (e.g., by the aggregation state) that the aggregation value(s) of aggregation row 608 has changed and an AMDR notification indicating the change can be generated for any child nodes (or subscribers) of t2.

Figure 9C:
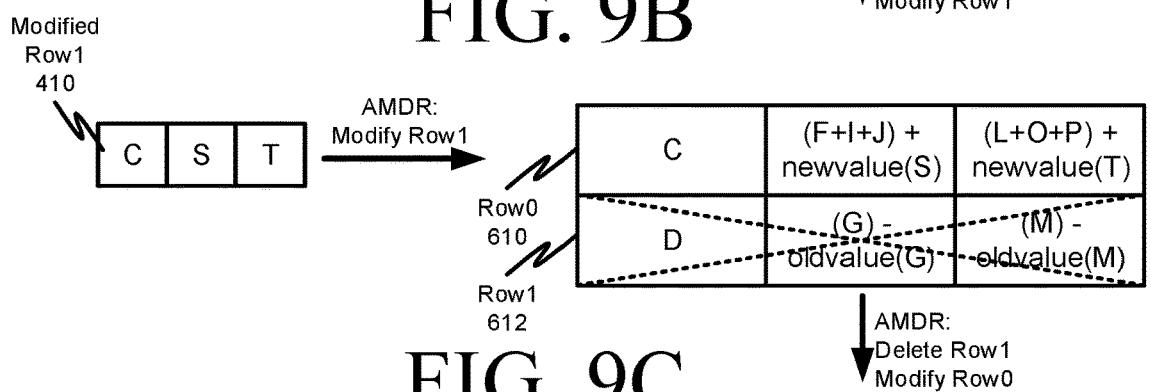
FIG. 9C illustrates automatic updating of an aggregation result when a row is modified in a source table and the modification includes a change to the key in accordance with some implementations.

FIG. 9C illustrates automatic updating of an aggregation result when a row is modified in a source table and the modification includes a change to the key in accordance with some implementations. When row 410 of t1 is modified as shown in FIG. 9C, t2 is notified via an AMDR message.

In some implementations, processing the update can include determining that the key (i.e., value of the grouping column 402) of row 410 has changed from "D" to "C" (by comparing its oldvalue and newvalue for the current update/refresh/clock cycle) and identifying the aggregation state(s) associated with those key (e.g., aggregation states 1306 and 1308 shown in FIG. 8C). The associated aggregation state(s) can process the row modification by accessing a small subset of rows of the source table aggregated by the aggregation state (e.g., without accessing the values of other rows of t1 that had previously been aggregated by the aggregation state). The aggregation state associated with the key's oldvalue can process the update by, for each aggregated column, removing the oldvalue of the column in row 410 from the aggregation value. The aggregation state associated with the key's newvalue can process the update by, for each aggregated column, adding the newvalue of the column in row 410 to the aggregation value.

For column 604 of aggregation row 610, the current aggregation value is the result of the sum of (F+I+J), and the summation aggregation state associated with that column/row can determine an updated aggregation value by adding the corresponding newvalue(S) to (F+I+J). For column 606 of aggregation row 610, the current aggregation value is the result of (L+O+P), and the summation aggregation state can determine the updated aggregation value by adding the corresponding newvalue(T). It can be determined (e.g., by the aggregation state) that the aggregation value(s) of aggregation row 610 has changed and an AMDR notification indicating the change can be generated for any child nodes (or subscribers) of t2.

For column 604 of aggregation row 612, the current aggregation value is the result of the sum of (G), and the summation aggregation state associated with that column/row can determine an updated aggregation value by subtracting the corresponding oldvalue(G) from (G). For column 606 of aggregation row 612, the current aggregation value is the result of (M), and the summation aggregation state can determine the updated aggregation value by subtracting the corresponding oldvalue(M). It can be determined (e.g., by the aggregation state) that aggregation row 608 now contains zero entries, and the aggregation row 608 can be removed from t2 and an AMDR notification indicating the change can be generated for any child nodes (or subscribers) of t2.

Figure 9D:
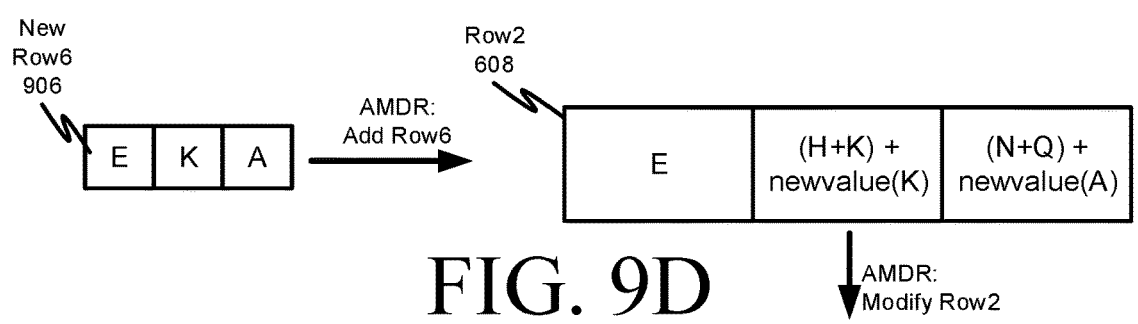
FIG. 9D illustrates automatic updating of an aggregation result when a row is added to a source table in accordance with some implementations. When row 906 is added to t1 is added as shown in FIG. 9D, t2 is notified via an AMDR message.

FIG. 9D illustrates automatic updating of an aggregation result when a row is added to a source table in accordance with some implementations. When row 906 is added to t1 is added as shown in FIG. 9D, t2 is notified via an AMDR message.

In some implementations, processing the update can include identifying the aggregation state(s) associated with the key (i.e., value of the grouping column 402) of row 906 (e.g., aggregation state 1310 shown in FIG. 8C). The associated aggregation state(s) can process the row modification by accessing a small subset of rows of the source table aggregated by the aggregation state (e.g., without accessing the values of other rows of t1 that had previously been aggregated by the aggregation state). The associated aggregation state(s) can process the update by, for each aggregated column, adding the newvalue of the column in row 906 to the aggregation value.

For column 604 of aggregation row 608, the current aggregation value is the result of the sum of (H+K), and the summation aggregation state associated with that column/row can determine an updated aggregation value by adding the corresponding newvalue(K) to (H+K). For column 606 of aggregation row 608, the current aggregation value is the result of (N+Q), and the summation aggregation state can determine the updated aggregation value by adding the corresponding newvalue(A). It can be determined (e.g., by the aggregation state) that the aggregation value(s) of aggregation row 608 has changed and an AMDR notification indicating the change can be generated for any child nodes (or subscribers) of t2.

Figure 9E:
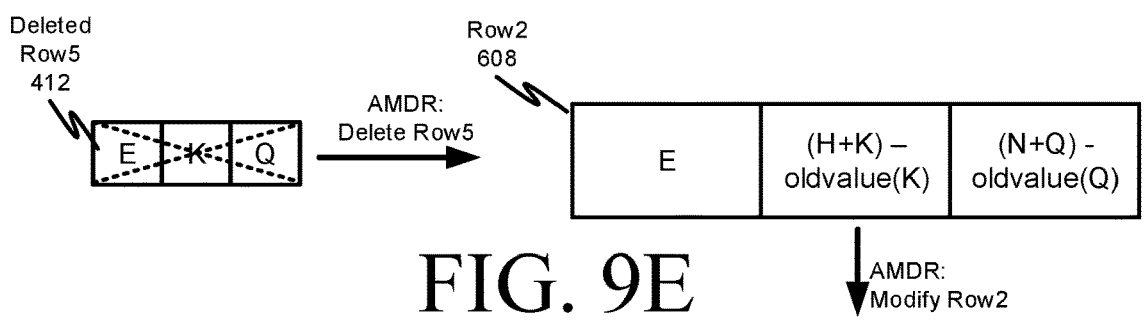
FIG. 9E illustrates automatic updating of an aggregation result when a row is deleted from a source table in accordance with some implementations.

FIG. 9E illustrates automatic updating of an aggregation result when a row is deleted from a source table in accordance with some implementations. When row 412 is deleted from t1 is added as shown in FIG. 9E, t2 is notified via an AMDR message.

In some implementations, processing the update can include identifying the aggregation state(s) associated with the key (i.e., value of the grouping column 402) of row 412 (e.g., aggregation state 1310 shown in FIG. 8C). The associated aggregation state(s) can process the row modification by accessing a small subset of rows of the source table aggregated by the aggregation state (e.g., without accessing the values of other rows of t1 that had previously been aggregated by the aggregation state). The associated aggregation state(s) can process the update by, for each aggregated column, deleting the oldvalue of the column in row 412 from the aggregation value.

For column 604 of aggregation row 608, the current aggregation value is the result of the sum of (H+K), and the summation aggregation state associated with that column/row can determine an updated aggregation value by subtracting the corresponding oldvalue(K) from (H+K). For column 606 of aggregation row 608, the current aggregation value is the result of (N+Q), and the summation aggregation state can determine the updated aggregation value by subtracting the corresponding oldvalue(Q). It can be determined (e.g., by the aggregation state) that the aggregation value(s) of aggregation row 608 has changed and an AMDR notification indicating the change can be generated for any child nodes (or subscribers) of t2.

Figure 10:
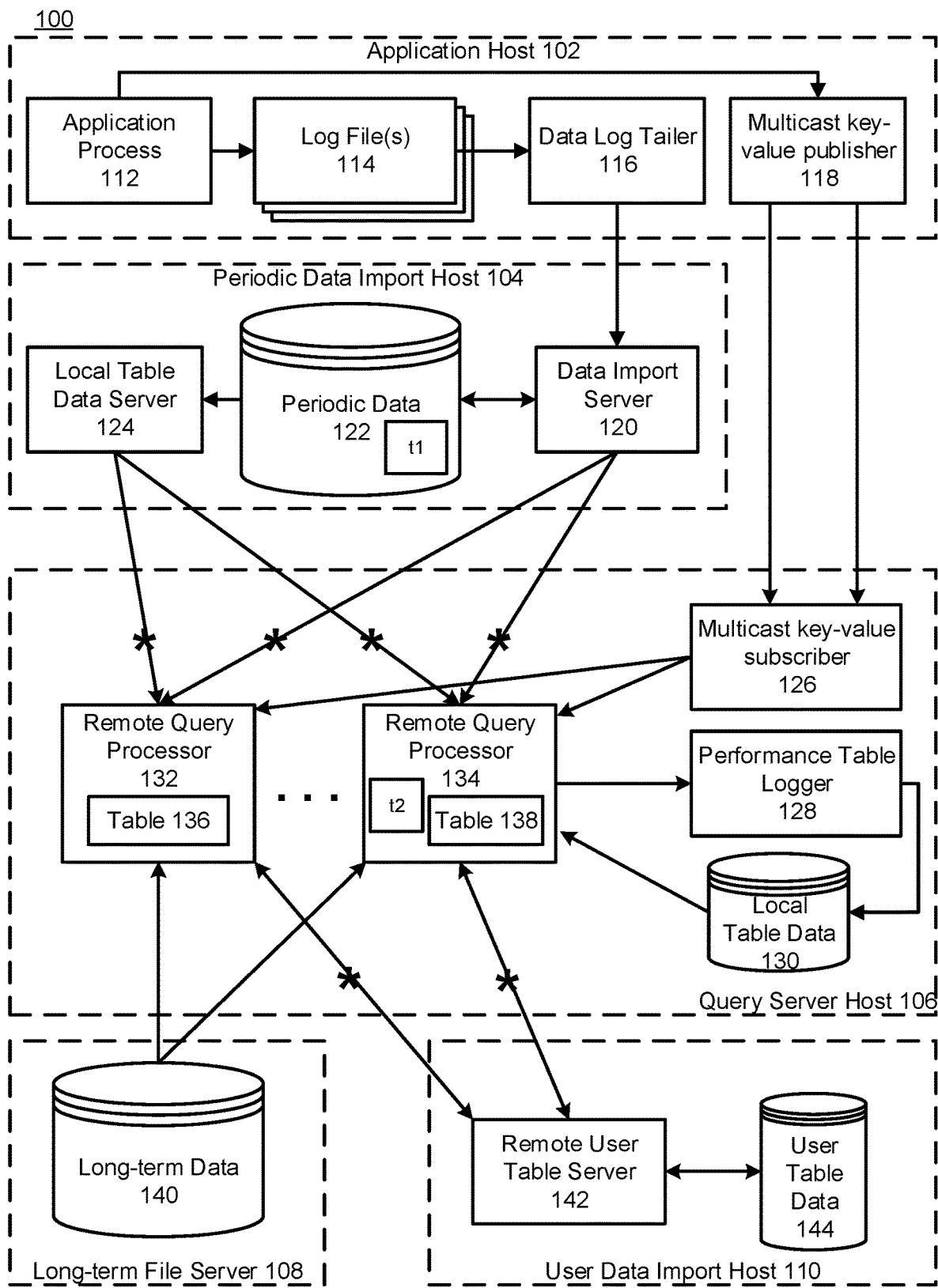
FIG. 10 is a diagram of an example computer data system showing an example data distribution configuration in accordance with some implementations.
Figure 11:
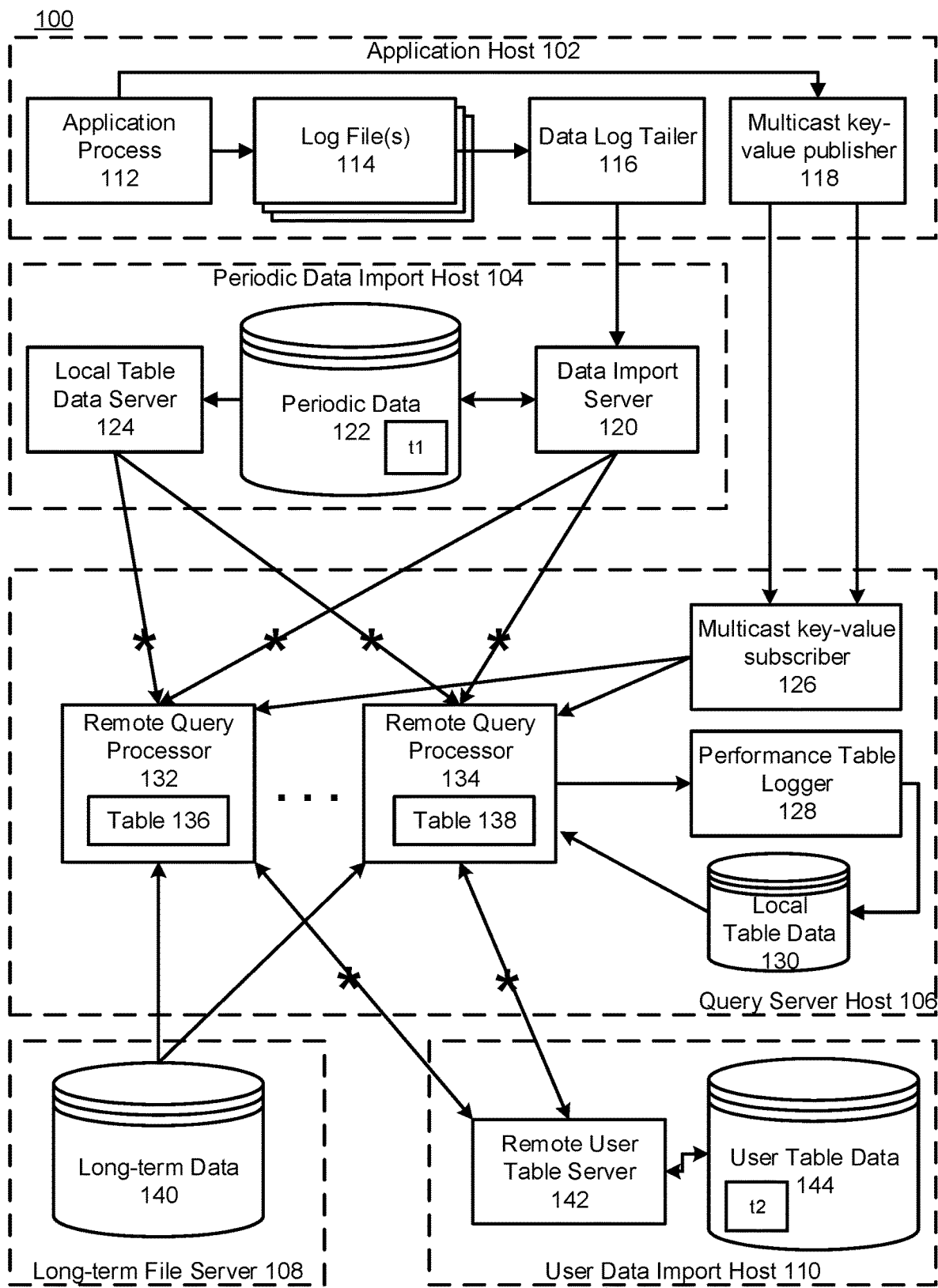
FIG. 11 is a diagram of an example computer data system showing an example data distribution configuration in accordance with some implementations.

FIGS. 10 and 11 are diagrams of example computer data system 100 showing an example data distribution configuration in accordance with some implementations. Source table t1 can be stored in periodic data 122 and aggregation result table t2 can be stored at remote query processor 134, as shown in FIG. 10, and/or at table user data 144, as shown in FIG. 11.

Figure 13:
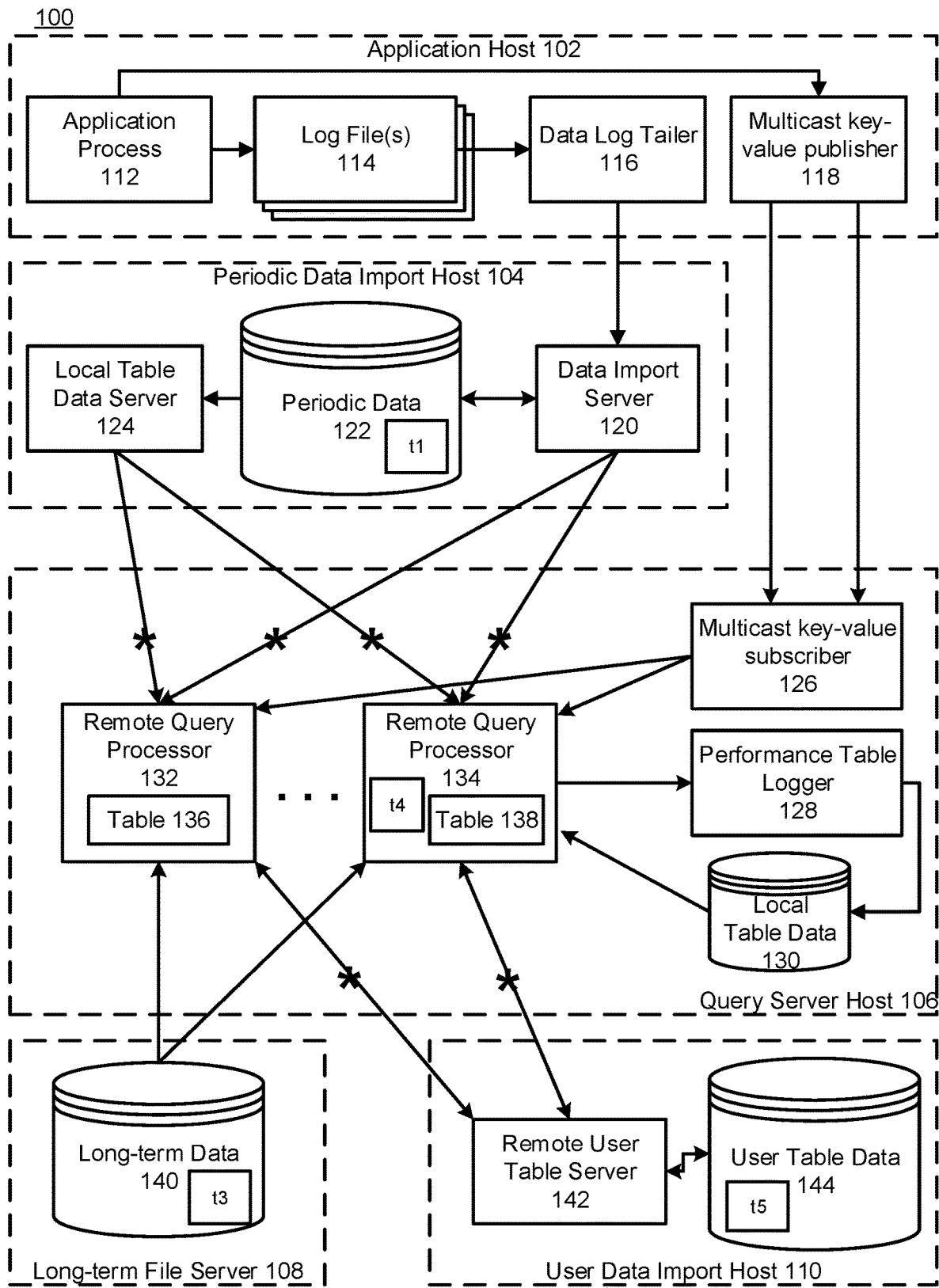
FIG. 13 is a diagram of an example computer data system showing an example data distribution configuration in accordance with some implementations.

FIG. 13 is a diagram of example computer data system 100 showing an example data distribution configuration in accordance with some implementations. Source table t1 can be stored in periodic data 122, source table t3 can be stored at long-term data 140, source table t4 can be stored at remote query processor 134, and aggregation result table t5 can be stored at user table data 144.

Figure 12:
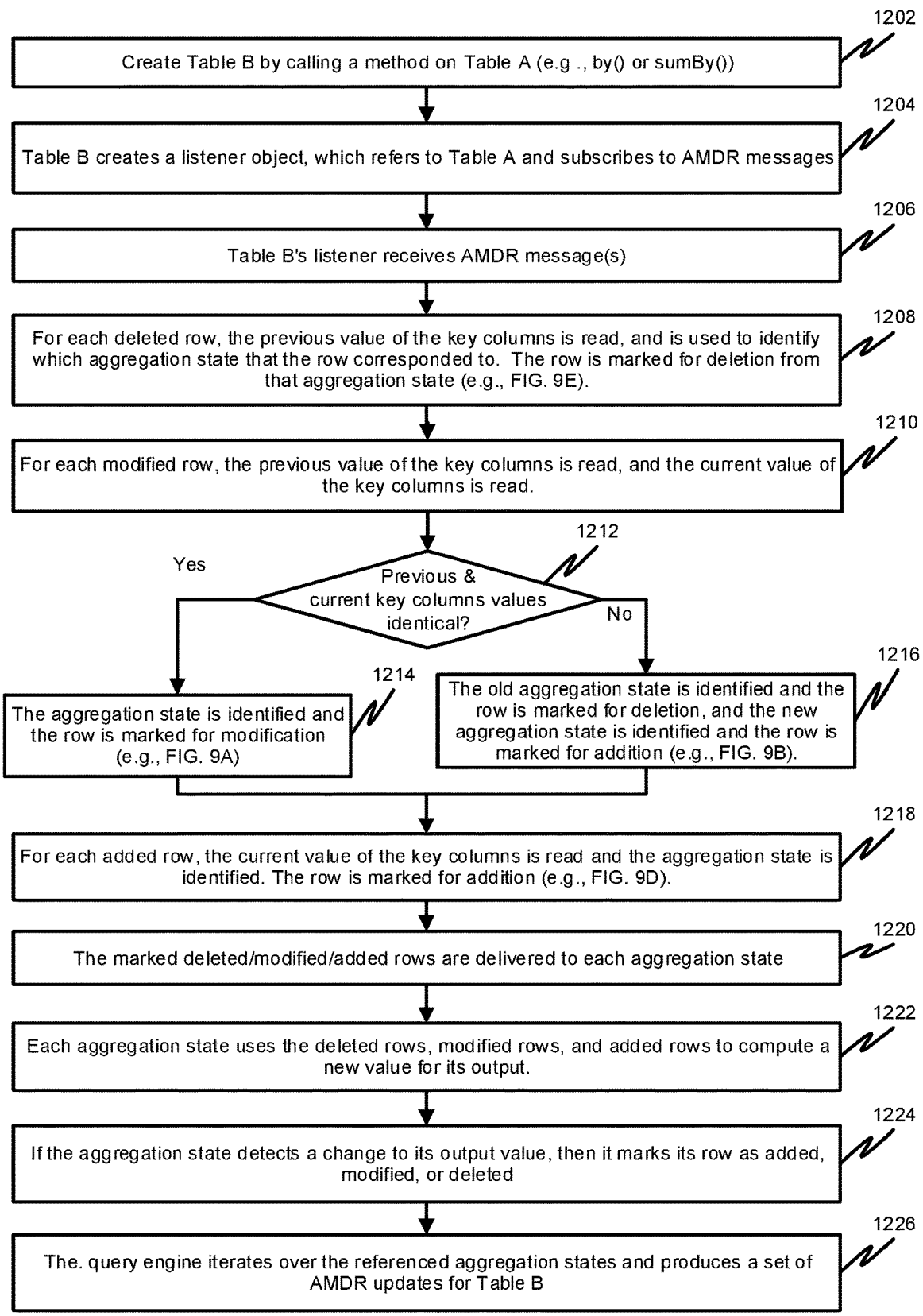
FIG. 12 is a flowchart of an example aggregation operation in accordance with some implementations.

FIG. 12 is a flowchart of an example aggregation operation in accordance with some implementations. Processing begins at 1202.

At 1202, Table B is created by calling a method on Table A (e.g., by( ), sumBy( ), or other aggregation operation). Processing continues to 1204.

At 1204, Table B creates a listener object, which refers to Table A and subscribes to AMDR messages. Table A can be a source table that generates an AMDR, or in response to an update from one of its parents, generates an AMDR. Processing continues to 1206.

At 1206, Table B's listener receives the AMDR message(s). Processing continues to 1208.

At 1208, for each deleted row, the previous value of the key columns is read, and is used to identify which aggregation state (or states) that the row corresponded to. The row is marked for deletion from that aggregation state (or states). Processing continues to 1210.

At 1210, for each modified row, the previous value of the key columns is read, and the current value of the key columns is read. Processing continues to 1212.

At 1212, the previous (i.e., oldvalue) and current (i.e., newvalue) values of the key columns are compared. If they are identical, processing continues to 1214. Otherwise, processing continues to 1216.

At 1214, the aggregation state is identified and the row is marked for modification (e.g., FIG. 9A). Processing continues to 1218.

At 1216, the old aggregation state is identified and the row is marked for deletion, and the new aggregation state is identified and the row is marked for addition (e.g., FIG. 9B). Processing continues to 1218.

At 1218, for each added row, the current value of the key columns is read and the aggregation state is identified. The row is marked for addition (e.g., FIG. 9D). Processing continues to 1220.

At 1220, the marked deleted/modified/added rows are delivered to each aggregation state. Processing continues to 1222.

At 1222, each aggregation state uses the marked deleted rows, modified rows, and added rows to compute a new value for its output. In some implementations, the aggregation states can use the clock cycle oldvalues and/or newvalues to compute the new value for its output as shown, for example, in FIGS. 9A-9E. Processing continues to 1224.

At 1224, if the aggregation state detects a change to its output value, then it marks its row as added, modified, or deleted. Processing continues to 1226.

At 1226, the. query engine iterates over the referenced aggregation states and produces a set of AMDR update for any downstream tables (e.g., tables that have subscribed to receive updates from Table B.

Some implementations include a method for maximizing memory and processing efficiencies in a computer system. In some such implementations, the method can include receiving an aggregation query task (e.g., at a remote query processor such as RQP 132) to create a second table object comprising an updateable aggregation of rows from a first table object. The data of the first table object can be stored in a computer storage and the second table object can be creating and stored in a computer memory separate from the computer storage, in some implementations.

The method can include creating a plurality of aggregation states for a plurality of aggregation rows of the second table object, each of the plurality of aggregation rows representing an aggregation of one or more rows of the first table object, each of the plurality of aggregation states being configured to determine an aggregated value for a respective one of the plurality of aggregation rows by executing an aggregation formula. The aggregated values can comprise a collection (e.g., an array) for each of one or more aggregated columns of each row of the second table object; and the collection can comprise references to data of the first table object.

The method can further include storing determined aggregated values in the computer memory. In some implementations, the aggregated values are stored in the computer memory separate from the computer storage.

The method can include creating and starting a listener for the second table object.

The method can include subscribing to receive at the listener an indication of an update to the first table object. The method can further include, responsive to receiving the indication at the listener, selecting one or more of the aggregation states to update the second table object and accessing at most only a subset of rows of the first table object, thereby eliminating the use of repeat processing time for re-executing the aggregation formula and providing faster access to the plurality of aggregation rows of the second table object.

In some implementations, the method can include detecting a change to an output of an aggregation state of the plurality of aggregation states, and transmitting, responsive to the detecting, a change notification (e.g., an AMDR) to a subscriber of the second table object.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC), a field programmable gate array (FPGA) or the like. The instructions can be compiled/interpreted from source code instructions provided in accordance with a programming language such as Java, C, C++, C#.net, assembly or the like. The instructions can also comprise code and data objects provided in accordance with, for example, the Visual Basic™ language, a specialized database query language, or another structured, object-oriented or other programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, methods, systems and computer readable media for memory-efficient and processor-efficient aggregation and data source refreshing.

Application Ser. No. 15/154,974, entitled "DATA PARTITIONING AND ORDERING" (Attorney Docket No. W1.1-10057) and filed in the United States Patent and Trademark Office on May 14, 2016, is hereby incorporated by reference herein in its entirety as if fully set forth herein.

Application Ser. No. 15/154,975, entitled "COMPUTER DATA SYSTEM DATA SOURCE REFRESHING USING AN UPDATE PROPAGATION GRAPH" (Attorney Docket No. W1.4-10058) and filed in the United States Patent and Trademark Office on May 14, 2016, is hereby incorporated by reference herein in its entirety as if fully set forth herein.

Application Ser. No. 15/154,979, entitled "COMPUTER DATA SYSTEM POSITION-INDEX MAPPING" (Attorney Docket No. W1.5-10083) and filed in the United States Patent and Trademark Office on May 14, 2016, is hereby incorporated by reference herein in its entirety as if fully set forth herein.

Application Ser. No. 15/154,980, entitled "SYSTEM PERFORMANCE LOGGING OF COMPLEX REMOTE QUERY PROCESSOR QUERY OPERATIONS" (Attorney Docket No. W1.6-10074) and filed in the United States Patent and Trademark Office on May 14, 2016, is hereby incorporated by reference herein in its entirety as if fully set forth herein.

Application Ser. No. 15/154,983, entitled "DISTRIBUTED AND OPTIMIZED GARBAGE COLLECTION OF REMOTE AND EXPORTED TABLE HANDLE LINKS TO UPDATE PROPAGATION GRAPH NODES" (Attorney Docket No. W1.8-10085) and filed in the United States Patent and Trademark Office on May 14, 2016, is hereby incorporated by reference herein in its entirety as if fully set forth herein.

Application Ser. No. 15/154,984, entitled "COMPUTER DATA SYSTEM CURRENT ROW POSITION QUERY LANGUAGE CONSTRUCT AND ARRAY PROCESSING QUERY LANGUAGE CONSTRUCTS" (Attorney Docket No. W2.1-10060) and filed in the United States Patent and Trademark Office on May 14, 2016, is hereby incorporated by reference herein in its entirety as if fully set forth herein.

Application Ser. No. 15/154,985, entitled "PARSING AND COMPILING DATA SYSTEM QUERIES" (Attorney Docket No. W2.2-10062) and filed in the United States Patent and Trademark Office on May 14, 2016, is hereby incorporated by reference herein in its entirety as if fully set forth herein.

Application Ser. No. 15/154,987, entitled "DYNAMIC FILTER PROCESSING" (Attorney Docket No. W2.4-10075) and filed in the United States Patent and Trademark Office on May 14, 2016, is hereby incorporated by reference herein in its entirety as if fully set forth herein.

Application Ser. No. 15/154,988, entitled "DYNAMIC JOIN PROCESSING USING REAL-TIME MERGED NOTIFICATION LISTENER" (Attorney Docket No. W2.6-10076) and filed in the United States Patent and Trademark Office on May 14, 2016, is hereby incorporated by reference herein in its entirety as if fully set forth herein.

Application Ser. No. 15/154,990, entitled "DYNAMIC TABLE INDEX MAPPING" (Attorney Docket No. W2.7-10077) and filed in the United States Patent and Trademark Office on May 14, 2016, is hereby incorporated by reference herein in its entirety as if fully set forth herein.

Application Ser. No. 15/154,991, entitled "QUERY TASK PROCESSING BASED ON MEMORY ALLOCATION AND PERFORMANCE CRITERIA" (Attorney Docket No. W2.8-10094) and filed in the United States Patent and Trademark Office on May 14, 2016, is hereby incorporated by reference herein in its entirety as if fully set forth herein.

Application Ser. No. 15/154,993, entitled "A MEMORY-EFFICIENT COMPUTER SYSTEM FOR DYNAMIC UPDATING OF JOIN PROCESSING" (Attorney Docket No. W2.9-10107) and filed in the United States Patent and Trademark Office on May 14, 2016, is hereby incorporated by reference herein in its entirety as if fully set forth herein.

Application Ser. No. 15/154,995, entitled "QUERY DISPATCH AND EXECUTION ARCHITECTURE" (Attorney Docket No. W3.1-10061) and filed in the United States Patent and Trademark Office on May 14, 2016, is hereby incorporated by reference herein in its entirety as if fully set forth herein.

Application Ser. No. 15/154,996, entitled "COMPUTER DATA DISTRIBUTION ARCHITECTURE" (Attorney Docket No. W3.2-10087) and filed in the United States Patent and Trademark Office on May 14, 2016, is hereby incorporated by reference herein in its entirety as if fully set forth herein.

Application Ser. No. 15/154,997, entitled "DYNAMIC UPDATING OF QUERY RESULT DISPLAYS" (Attorney Docket No. W3.3-10059) and filed in the United States Patent and Trademark Office on May 14, 2016, is hereby incorporated by reference herein in its entirety as if fully set forth herein.

Application Ser. No. 15/154,998, entitled "DYNAMIC CODE LOADING" (Attorney Docket No. W3.4-10065) and filed in the United States Patent and Trademark Office on May 14, 2016, is hereby incorporated by reference herein in its entirety as if fully set forth herein.

Application Ser. No. 15/154,999, entitled "IMPORTATION, PRESENTATION, AND PERSISTENT STORAGE OF DATA" (Attorney Docket No. W3.5-10088) and filed in the United States Patent and Trademark Office on May 14, 2016, is hereby incorporated by reference herein in its entirety as if fully set forth herein.

Application Ser. No. 15/155,001, entitled "COMPUTER DATA DISTRIBUTION ARCHITECTURE" (Attorney Docket No. W3.7-10079) and filed in the United States Patent and Trademark Office on May 14, 2016, is hereby incorporated by reference herein in its entirety as if fully set forth herein.

Application Ser. No. 15/155,005, entitled "PERSISTENT QUERY DISPATCH AND EXECUTION ARCHITECTURE" (Attorney Docket No. W4.2-10089) and filed in the United States Patent and Trademark Office on May 14, 2016, is hereby incorporated by reference herein in its entirety as if fully set forth herein.

Application Ser. No. 15/155,006, entitled "SINGLE INPUT GRAPHICAL USER INTERFACE CONTROL ELEMENT AND METHOD" (Attorney Docket No. W4.3-10063) and filed in the United States Patent and Trademark Office on May 14, 2016, is hereby incorporated by reference herein in its entirety as if fully set forth herein.

Application Ser. No. 15/155,007, entitled "GRAPHICAL USER INTERFACE DISPLAY EFFECTS FOR A COMPUTER DISPLAY SCREEN" (Attorney Docket No. W4.4-10090) and filed in the United States Patent and Trademark Office on May 14, 2016, is hereby incorporated by reference herein in its entirety as if fully set forth herein.

Application Ser. No. 15/155,009, entitled "COMPUTER ASSISTED COMPLETION OF HYPERLINK COMMAND SEGMENTS" (Attorney Docket No. W4.5-10091) and filed in the United States Patent and Trademark Office on May 14, 2016, is hereby incorporated by reference herein in its entirety as if fully set forth herein.

Application Ser. No. 15/155,010, entitled "HISTORICAL DATA REPLAY UTILIZING A COMPUTER SYSTEM" (Attorney Docket No. W5.1-10080) and filed in the United States Patent and Trademark Office on May 14, 2016, is hereby incorporated by reference herein in its entirety as if fully set forth herein.

Application Ser. No. 15/155,011, entitled "DATA STORE ACCESS PERMISSION SYSTEM WITH INTERLEAVED APPLICATION OF DEFERRED ACCESS CONTROL FILTERS" (Attorney Docket No. W6.1-10081) and filed in the United States Patent and Trademark Office on May 14, 2016, is hereby incorporated by reference herein in its entirety as if fully set forth herein.

Application Ser. No. 15/155,012, entitled "REMOTE DATA OBJECT PUBLISHING/SUBSCRIBING SYSTEM HAVING A MULTICAST KEY-VALUE PROTOCOL" (Attorney Docket No. W7.2-10064) and filed in the United States Patent and Trademark Office on May 14, 2016, is hereby incorporated by reference herein in its entirety as if fully set forth herein.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A system for maximizing memory and processing efficiencies in a computer system, the system comprising:
   one or more processors;
   computer readable storage coupled to the one or more processors, the computer readable storage having stored thereon instructions that, when executed by the one or more processors, cause the one or more processors to perform operations including:
      sending a digital request from a client computer to a remote query processor on a query server computer;
      creating and storing, in a computer storage separate from the computer readable storage, data in a plurality of column sources;
      creating and storing in a computer memory a first table object index mapping data in the plurality of column sources to a first table object, the computer memory having faster access time than the computer storage separate from the computer readable storage;
      at the remote query processor, providing remote operations including:
         an aggregation query operation, the aggregation query operation comprising:
            receiving an aggregation query task to create a second table object comprising an updateable aggregation of rows from the first table object;
            creating and storing in the computer memory separate from the computer storage, the second table object;
            creating a plurality of aggregation states for a plurality of aggregation rows of the second table object, each of the plurality of aggregation rows representing an aggregation of one or more rows of the first table object, each of the plurality of aggregation states being configured to determine an aggregated value for a respective one of the plurality of aggregation rows by executing an aggregation formula;
            storing determined aggregated values in the computer memory separate from the computer storage;
            creating and starting a listener for the second table object; and
            subscribing to receive at the listener an indication of an update to the first table object and, responsive to receiving the indication at the listener, selecting one or more of the aggregation states to update the second table object and accessing a subset of rows of the first table object, wherein the subset of rows is smaller than the first table object, the computer storage separate from the computer readable storage being remote from the remote query processor and being accessed by the remote query processor via a network, and the computer memory being local to the remote query processor.

2. The system of claim 1, wherein the aggregated values comprise a collection for each aggregated column of each row of the second table object.

3. The system of claim 2,
wherein a first collection of a first aggregated column of a first row of the second table object is a first ordered collection;
wherein a second collection of a second aggregated column of the first row of the second table object is a second ordered collection; and
wherein the first ordered collection and the second ordered collection have a same ordering.

4. The system of claim 2, wherein the collection comprises a reference to data of the first table object.

5. The system of claim 1, wherein the aggregation function determines a summation and the aggregated values comprise a running sum.

6. The system of claim 1, wherein the aggregation function determines a standard deviation and the aggregated values comprise a running sum, a running sum of squares, and a count.

7. A system for maximizing memory and processing efficiencies in a computer system, the system comprising:
one or more processors;
computer readable storage coupled to the one or more processors, the computer readable storage having stored thereon instructions that, when executed by the one or more processors, cause the one or more processors to perform operations including:
storing a second table object representing an updateable aggregation of rows from a first table object;
creating a plurality of aggregation states for a plurality of aggregation rows of the second table object, each of the plurality of aggregation rows representing an aggregation of one or more rows of the first table object, each of the plurality of aggregation states being configured to determine an aggregated value for a respective one of the plurality of aggregation rows by executing an aggregation formula;
storing determined aggregated values in the computer memory separate from the computer readable storage;
receiving an indication of an update to the first table object; and
responsive to receiving, selecting one or more of the aggregation states to update the second table object and accessing a subset of rows of the first table object.

8. The system of claim 7, wherein the aggregated values comprise a collection for each aggregated column of each row of the second table object.

9. The system of claim 8,
wherein a first collection of a first aggregated column of a first row of the second table object is a first ordered collection;
wherein a second collection of a second aggregated column of the first row of the second table object is a second ordered collection; and
wherein the first ordered collection and the second ordered collection have a same ordering.

10. The system of claim 8, wherein the collection comprises a reference to data of the first table object.

11. The system of claim 8, the operations further comprising:
determining a mapping of a subset of columns and applying the mapping to one or more other columns to create one or more of the collections for the aggregated columns of the second table object.

12. The system of claim 7, wherein the aggregation function determines a weighted average.

13. The system of claim 7, wherein a combination aggregation is determined for a row of the second table object by two or more of the plurality of aggregation states.

14. The system of claim 7,
wherein data of the first table object is stored in a computer storage separate from the computer readable storage that is remote from a computer memory separate from the computer readable storage and the computer storage and is accessed via a network, and
wherein the computer memory separate from the computer readable storage is local to the one or more processors.

15. A nontransitory computer readable medium having stored thereon software instructions that, when executed by one or more processors, cause the one or more processors to perform operations including:
storing, in a computer memory separate from the nontransitory computer readable medium, a second table object representing an updateable aggregation of rows from a first table object;
creating, at a processor coupled to the computer memory, a plurality of aggregation states for a plurality of aggregation rows of the second table object, each of the plurality of aggregation rows representing an aggregation of one or more rows of the first table object, each of the plurality of aggregation states being configured to determine an aggregated value for a respective one of the plurality of aggregation rows by executing an aggregation formula;
storing determined aggregated values in the computer memory;
receiving an indication of an update to the first table object; and
responsive to receiving, selecting one or more of the aggregation states to update the second table object and accessing a subset of rows of the first table object, wherein the subset of rows is smaller than the first table object.

16. The nontransitory computer readable medium of claim 15, wherein the aggregated values comprise a collection for each aggregated column of each row of the second table object.

17. The nontransitory computer readable medium of claim 16,
wherein a first collection of a first aggregated column of a first row of the second table object is a first ordered collection;
wherein a second collection of a second aggregated column of the first row of the second table object is a second ordered collection; and
wherein the first ordered collection and the second ordered collection have a same ordering.

18. The nontransitory computer readable medium of claim 16, wherein the collection comprises a reference to data of the first table object.

19. The nontransitory computer readable medium of claim 16, the operations further comprising:
  determining a mapping of a subset of columns and applying the mapping to one or more other columns to create one or more of the collections for the aggregated columns of the second table object.

20. The nontransitory computer readable medium of claim 15, wherein the aggregation function determines a maximum value.

21. The nontransitory computer readable medium of claim 15,
  wherein data of the first table object is stored in a computer storage separate from the nontransitory computer readable medium and the computer memory that is remote from the computer memory and is accessed via a network, and
  wherein the computer memory is local to the one or more processors.

22. A method for maximizing memory and processing efficiencies in a computer system, the system comprising:
  storing, in a computer memory, a second table object representing an updateable aggregation of rows from a first table object;
  creating, at a processor coupled to the computer memory, a plurality of aggregation states for a plurality of aggregation rows of the second table object, each of the plurality of aggregation rows representing an aggregation of one or more rows of the first table object, each of the plurality of aggregation states being configured to determine an aggregated value for a respective one of the plurality of aggregation rows;
  storing determined aggregated values in the computer memory;
  receiving an indication of an update to the first table object; and
  responsive to receiving, selecting one or more of the aggregation states to update the second table object and accessing a subset of rows of the first table object.

23. The method of claim 22, wherein the aggregated values comprise a collection for each of one or more aggregated columns of each row of the second table object.

24. The method of claim 23,
  wherein a first collection of a first aggregated column of a first row of the second table object is a first ordered collection;
  wherein a second collection of a second aggregated column of the first row of the second table object is a second ordered collection; and
  wherein the first ordered collection and the second ordered collection have a same ordering.

25. The method of claim 24, wherein the first ordering and the second ordering is determined based on an ordering of the first table object.

26. The method of claim 23, wherein the collection comprises a reference to data of the first table object.

27. The method of claim 23, further comprising:
  determining a mapping of a subset of columns and applying the mapping to one or more other columns to create one or more of the collections for the aggregated columns of the second table object.

28. The method of claim 22, further comprising:
  detecting a change to an output of an aggregation state of the plurality of aggregation states; and
  transmitting, responsive to the detecting, a change notification to a subscriber of the second table object.

29. The method of claim 28, wherein the change notifications can include one of a data add notification, a data modify notification, a data delete notification and a data reindex notification.

30. The method of claim 22, wherein at least one of the plurality of aggregation states is configured to determine an aggregated value based on a new value and an associated previous value of the first table object.

* * * * *

UNITED STATES PATENT AND TRADEMARK OFFICE
CERTIFICATE OF CORRECTION

PATENT NO. : 10,565,206 B2
APPLICATION NO. : 15/351429
DATED : February 18, 2020
INVENTOR(S) : David R. Kent, IV et al.

It is certified that error appears in the above-identified patent and that said Letters Patent is hereby corrected as shown below:

On the Title Page

Item [72], insert:
--David R. Kent, IV, Colorado Springs, CO (US)
Ryan Caudy, New York, NY (US); Charles Wright,
Cortlandt Manor, NY (US); Radu Teodorescu,
New York, NY (US)--

Signed and Sealed this
Nineteenth Day of May, 2020

Andrei Iancu
*Director of the United States Patent and Trademark Office*